US010015151B2

(12) United States Patent
Liu et al.

(10) Patent No.: US 10,015,151 B2
(45) Date of Patent: Jul. 3, 2018

(54) METHOD AND APPARATUS FOR ENABLING SERVICE-CONFIGURABLE WIRELESS CONNECTIONS

(71) Applicant: Apple Inc., Cupertino, CA (US)

(72) Inventors: Yong Liu, Campbell, CA (US); Christiaan A. Hartman, San Jose, CA (US); Guoqing Li, Cupertino, CA (US); Chiu Ngok E. Wong, San Jose, CA (US); Su Khiong Yong, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 60 days.

(21) Appl. No.: 14/947,691

(22) Filed: Nov. 20, 2015

(65) Prior Publication Data

US 2016/0149901 A1    May 26, 2016

Related U.S. Application Data

(60) Provisional application No. 62/083,087, filed on Nov. 21, 2014.

(51) Int. Cl.
H04L 29/06 (2006.01)
H04L 9/32 (2006.01)
G06F 7/04 (2006.01)
H04L 9/00 (2006.01)
H04K 1/00 (2006.01)
H04W 12/06 (2009.01)
H04W 12/04 (2009.01)
H04W 84/12 (2009.01)

(52) U.S. Cl.
CPC ............ *H04L 63/061* (2013.01); *H04L 63/18* (2013.01); *H04W 12/04* (2013.01); *H04W 12/06* (2013.01); *H04W 84/12* (2013.01)

(58) Field of Classification Search
CPC ...... H04L 63/061; H04L 63/18; H04W 12/04; H04W 12/06; H04W 84/12
USPC ................ 713/156, 153, 166, 168; 726/1, 2; 380/262, 270
See application file for complete search history.

(56) References Cited

U.S. PATENT DOCUMENTS

| 6,768,749 | B1 * | 7/2004 | Osler | H04L 29/06 370/445 |
|---|---|---|---|---|
| 8,826,041 | B1 * | 9/2014 | Contreras | G06F 21/70 713/176 |
| 2005/0251680 | A1 * | 11/2005 | Brown | H04L 63/061 713/171 |
| 2008/0037786 | A1 * | 2/2008 | Park | H04L 63/0892 380/270 |

(Continued)

Primary Examiner — Aravind K Moorthy
(74) Attorney, Agent, or Firm — Sterne, Kessler, Goldstein & Fox P.L.L.C.

(57) ABSTRACT

The disclosed embodiments provide a system that enables service-configurable wireless connections. During operation, a local service endpoint of a service runs on a wireless device. The local service endpoint sends a request to establish a datapath with another service endpoint on another device. Meanwhile, the wireless device's service discovery module discovers a remote endpoint for the service on a remote device. In response to the request, the wireless device's service-configurable security entity configures a Wi-Fi connection's security configuration, thereby enabling the local endpoint to establish a datapath between the local endpoint and the remote endpoint over the Wi-Fi connection.

21 Claims, 18 Drawing Sheets

(56) References Cited

U.S. PATENT DOCUMENTS

| | | | | |
|---|---|---|---|---|
| 2010/0037295 A1* | 2/2010 | Oh | G06F 21/57 | 726/3 |
| 2011/0185173 A1* | 7/2011 | Liu | H04L 9/3226 | 713/168 |
| 2012/0042087 A1* | 2/2012 | Berg | H04L 63/08 | 709/229 |
| 2013/0247164 A1* | 9/2013 | Hoggan | H04W 12/06 | 726/8 |
| 2013/0286889 A1* | 10/2013 | Cherian | H04L 63/18 | 370/254 |
| 2013/0339724 A1* | 12/2013 | Amit | H04L 63/0272 | 713/151 |
| 2014/0086163 A1* | 3/2014 | Yang | H04W 72/04 | 370/329 |
| 2014/0092425 A1* | 4/2014 | Park | G06F 3/1292 | 358/1.15 |
| 2014/0207686 A1* | 7/2014 | Experton | G06F 19/3418 | 705/51 |
| 2014/0233545 A1* | 8/2014 | Ferguson-Jarnes | H04W 12/08 | 370/338 |
| 2015/0106887 A1* | 4/2015 | Aslund | H04L 63/0492 | 726/5 |
| 2015/0146706 A1* | 5/2015 | Goluboff | H04W 76/02 | 370/338 |
| 2015/0350003 A1* | 12/2015 | Anderson | H04L 29/06965 | 726/3 |
| 2015/0350895 A1* | 12/2015 | Brander | H04L 51/04 | 455/411 |
| 2015/0381621 A1* | 12/2015 | Innes | G06F 21/31 | 726/7 |
| 2016/0014669 A1* | 1/2016 | Patil | H04W 40/246 | 370/329 |
| 2016/0118793 A1* | 4/2016 | Davis | H04L 12/282 | 700/295 |
| 2016/0149901 A1* | 5/2016 | Liu | H04W 12/06 | 713/156 |
| 2016/0150412 A1* | 5/2016 | Liu | H04W 12/08 | 370/338 |
| 2016/0295413 A1* | 10/2016 | Liu | H04W 4/08 | |

\* cited by examiner

METHOD AND APPARATUS FOR ENABLING SERVICE-CONFIGURABLE WIRELESS CONNECTIONS

RELATED APPLICATIONS

This application claims priority under 35 U.S.C. § 119 to U.S. Provisional Application No. 62/083,087, entitled "Method and Apparatus for Enabling Service-configurable Wireless Connections", by the same inventors, filed on 21 Nov. 2014, and the contents of which are incorporated herein by reference in its entirety.

BACKGROUND

Technical Field

The disclosed embodiments relate to techniques for configuring and managing wireless connections between portable electronic devices.

Related Art

Wi-Fi® radio interfaces allow mobile devices to participate in various types of Wi-Fi networks, which include traditional infrastructure networks and Wi-Fi peer-to-peer (P2P) networks. The ability to form network connections without a physical cord provides a great advantage to these mobile devices because such devices tend to move from one location to another, all the while forming intermittent connections with other devices that happen to be within range.

However, mobile device users that happen to form a Wi-Fi P2P network have no physical way of stopping an unwanted device from attempting to connect to or eavesdrop on the network. To remedy this vulnerability, Wi-Fi networks may implement security protocols to (1) authenticate new devices, and (2) encrypt data transmissions sent within the network. The device that forms the Wi-Fi network (e.g. a Wi-Fi access point) generally dictates the security configuration of the network, thereby compelling all other network members to use the same security configuration. Applications executing on these devices are also bound to the same security configuration. This arrangement can cause problems when the security configuration is incompatible with an application's security requirements. For example, a user would not want to execute an application that transmits sensitive data to networked recipients in a Wi-Fi network that does not enable data encryption.

Thus, a method for enabling an application to configure the security configuration of a Wi-Fi connection is needed.

SUMMARY

The disclosed embodiments provide a system that enables service-configurable wireless connections. During operation, a local service endpoint of a service runs on a wireless device. The local service endpoint sends a request to establish a datapath with another service endpoint on another device. Meanwhile, the wireless device's service discovery module discovers a remote service endpoint for the service on a remote device. In response to the request, the wireless device's service-configurable security entity configures a Wi-Fi connection's security configuration, thereby enabling the local service endpoint to establish a datapath between the local service endpoint and the remote service endpoint over the Wi-Fi connection.

In some embodiments, the service-configurable security mechanism receives the local service endpoint's security requirements from the local service endpoint and the remote service endpoint's security requirements from the remote device. Additionally, the service-configurable security mechanism configures the Wi-Fi connection's security configuration to accommodate the local service endpoint's security requirements and the remote service endpoint's security requirements.

In some embodiments, the service-configurable security mechanism configures the Wi-Fi security configuration based on the security configurations of one or more existing Wi-Fi connections between the local device and the remote device that were established by service endpoints for other services.

BRIEF DESCRIPTION OF THE FIGURES

In the figures, like reference numerals refer to the same figure elements.

DETAILED DESCRIPTION

Figure 1A:
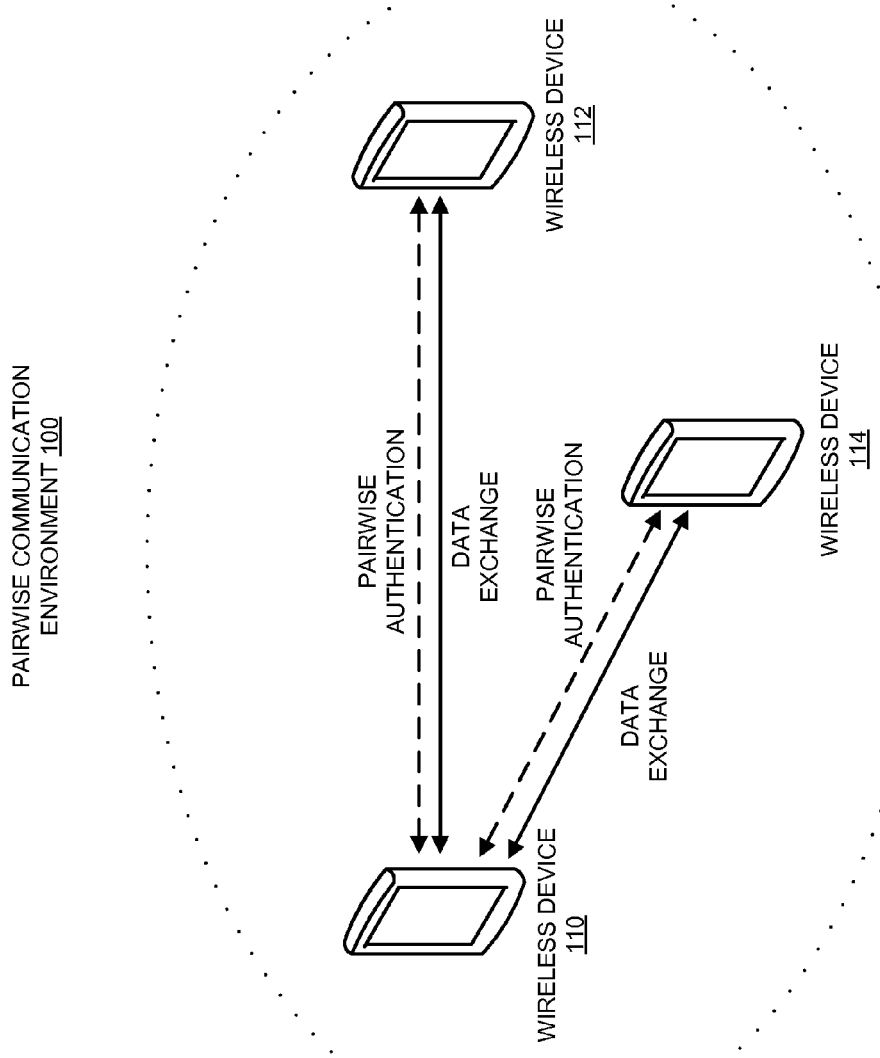
FIG. 1A illustrates a pairwise communication environment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

When a wireless device is physically proximate to a number of other wireless devices, the wireless device may form Wi-Fi P2P connections with one or more other devices. Wi-Fi P2P connections are direct connections between two end-user devices that don't involve an access point. Because both ends of a Wi-Fi P2P connection generally support the execution of services, a Wi-Fi P2P connection may enable a first services instance to establish a direct pairwise datapath with a second services instance. These services instances, which are referred to as service endpoints, may exchange data over the Wi-Fi P2P connection to supply application-specific P2P functionality to users.

Because modern operating systems provide multi-tasking capabilities, a contemporary wireless device is typically able to concurrently execute multiple service endpoints that correspond to different services. If the wireless device is connected to a Wi-Fi infrastructure network, service endpoints running on the wireless device are constrained by the infrastructure network's security configuration. Here, the network's access point unilaterally selects the infrastructure network's security configuration. The service endpoints have no say in the matter. Thus, if the access point decides not to enforce data encryption, service endpoints that transfer sensitive information may be out of luck. The same problem exists in Wi-Fi P2P networks. Here, one or both of the devices forming the Wi-Fi P2P connection dictate the connection's security configuration. Once again, the service endpoints have no say in the matter.

Some embodiments disclosed herein provide service-configurable wireless connections. More specifically, the disclosed embodiments enable service endpoints, which may exist in the application layer of a device, to control the security configurations of one or more Wi-Fi P2P connections of the device. For example, if a wireless device's Wi-Fi P2P connection does not provide data encryption, a service endpoint that transfers sensitive information may request the device to establish a second Wi-Fi P2P connection and manage the second Wi-Fi P2P connection's security settings to ensure that it provides data encryption. These embodiments provide the distinct advantage of enabling multiple service endpoints that (1) execute on a single device but (2) have different security requirements to (3) establish separate Wi-Fi P2P connections on the device, and (4) configure the separate Wi-Fi P2P connections to each suit the security requirements of one of the service endpoints.

Some embodiments disclosed herein also provide Wi-Fi service groups. More specifically, these embodiments enable a group of devices that are each running a service endpoint for a particular service to send and receive multicast transmissions that are specific to that service. A service group's security requirements may regulate (1) security configurations for Wi-Fi P2P connections between device members and (2) security configurations for transmitting multicast transmissions within the group. For example, a first service endpoint executing on a wireless device may found a first Wi-Fi service group that requires no multicast security because the purpose of the first group's service is to broadcast public information. On the same device, a second service endpoint, which multicasts sensitive data to trusted devices, may found a second Wi-Fi service group that requires multicast encryption. Thus, these embodiments provide the distinct advantage of (1) allowing a wireless device to concurrently participate in multiple service-specific multicasting groups with different security configurations and (2) providing service endpoints the ability to configure Wi-Fi multicast security.

Pairwise Communication Environment

Figure 1B:
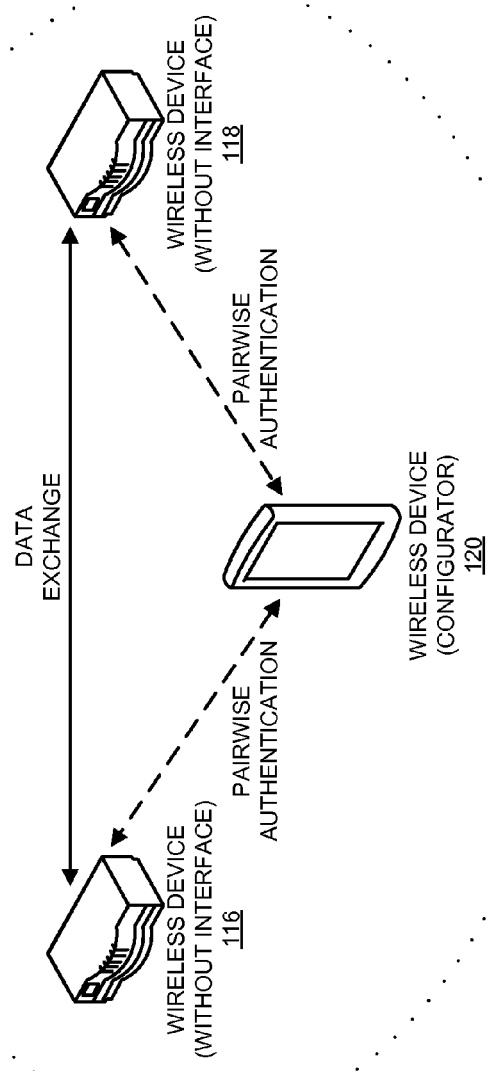
FIG. 1B illustrates a pairwise communication environment.

FIGS. 1A-1B illustrate pairwise communication environments in accordance with the disclosed embodiments. Pairwise communication environments 100 and 102 include a number of computer systems, which can include any type of computer system based on a microprocessor, a digital signal processor, a digital signal transmitter, a portable computing device, a personal organizer, a personal communications device, a device controller, or a computational engine within an appliance. Pairwise communication environment 100 of FIG. 1A includes wireless devices 110-114 while pairwise communication environment 102 of FIG. 1B includes wireless devices 116-120.

Wireless devices 110-120 may include any type of computing device that is capable of connecting to a network using a wireless communications protocol such as Wi-Fi. For example, wireless devices 110-120 may include a smartphone, a cell phone, a personal digital assistant (PDA), a laptop computer, a desktop computer, or a tablet computer. In particular, wireless devices 116-118 may include a device that provides a limited user interface or no user interface, thereby making it difficult for a user to directly interact with the device. Here, the user may instead interact with the device through the user interface of a configurator that is connected to the device over Wi-Fi. For example, wireless devices 116-118 may include a wireless headset, a wireless speaker, a wireless printer, a wireless scanner, a wireless access point, or a wireless router. Wireless device 120, which serves as the configurator, may include devices that include a user interface.

Note that different embodiments of the present invention may use different configurations, and are not limited to the configuration illustrated in pairwise communication environments 100 and 102.

Service Group Communication Environment

Figure 9A:
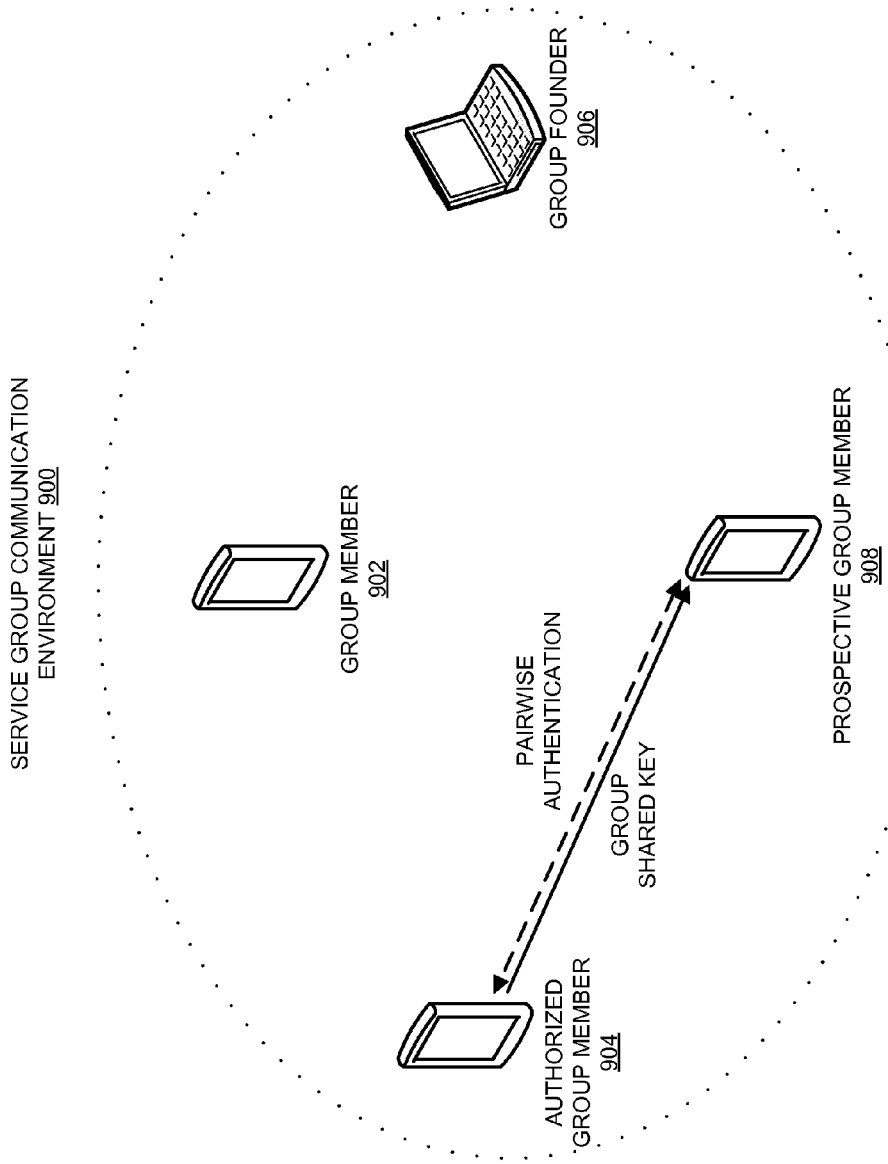
FIG. 9A illustrates a service group communication environment.
Figure 9B:
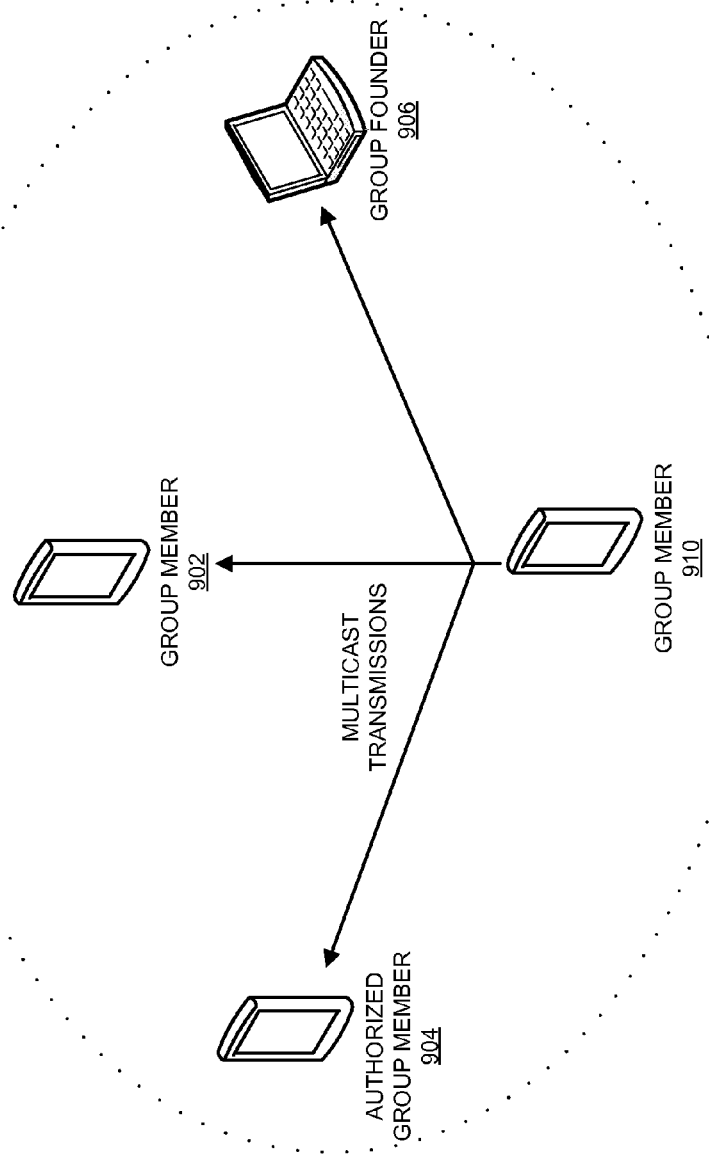
FIG. 9B illustrates a service group communication environment.

FIGS. 9A-9B illustrate service group communication environments in accordance with the disclosed embodiments. Service group communication environments 900 and 950 include a number of computer systems, which can include any type of computer system based on a microprocessor, a digital signal processor, a digital signal transmitter, a portable computing device, a personal organizer, a personal communications device, a device controller, or a computational engine within an appliance. Service group communication environment 900 of FIG. 9A includes group member 902, authorized group member 904, group founder 906, and prospective group member 908, while service group communication environment 950 includes group members 902 and 910, authorized group member 904, and group founder 906.

Group members 902 and 910, authorized group member 904, group founder 906, and prospective group member 908 may include any type of computing device that is capable of connecting to a network using a wireless communications protocol such as Wi-Fi. For example, group members 902 and 910, authorized group member 904, group founder 906, and prospective group member 908 may include a smartphone, a cell phone, a personal digital assistant (PDA), a laptop computer, a desktop computer, or a tablet computer.

Note that different embodiments of the present invention may use different configurations, and are not limited to the configuration illustrated in service group communication environments 900 and 950.

System

Figure 2A:
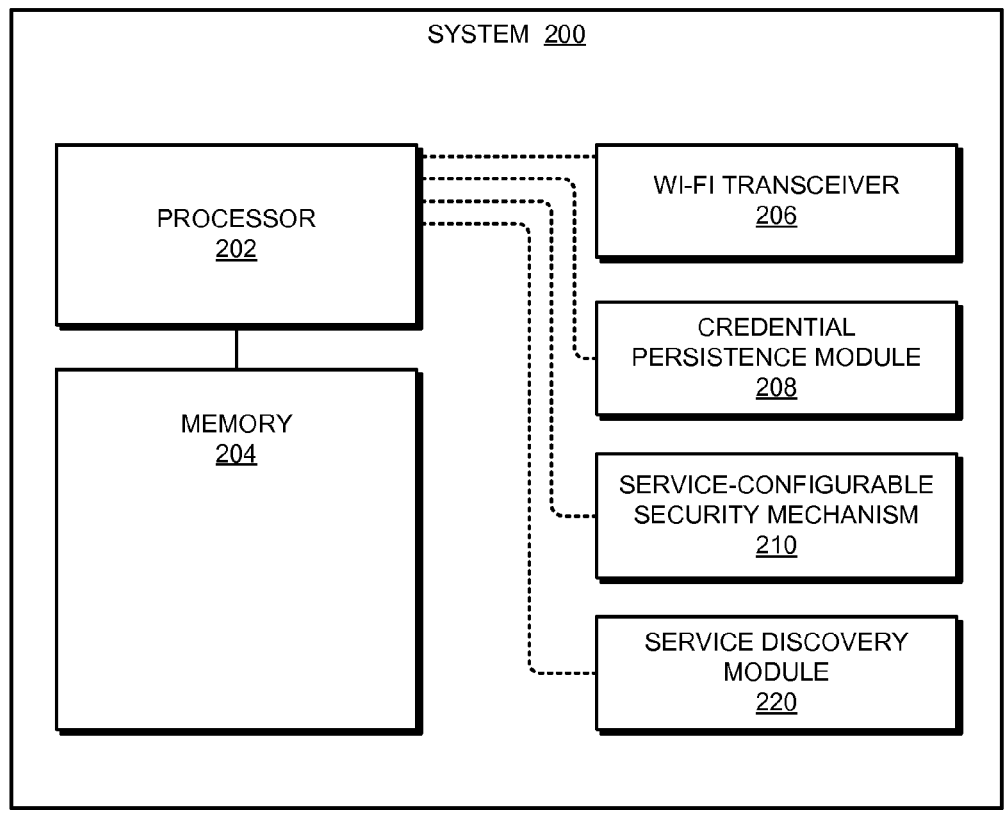
FIG. 2A illustrates a system.

FIG. 2A illustrates a system 200 in accordance with the disclosed embodiments. System 200 may comprise Wi-Fi transceiver 206, credential persistence module 208, service-configurable security mechanism 210, service discovery module (ASP) 220, processor 202, and memory 204. A service-configurable security mechanism may also be referred to as a service-configurable security entity (SCSE). Operations performed by these mechanisms and interfaces are described in more detail below.

Security Architecture

Figure 2B:
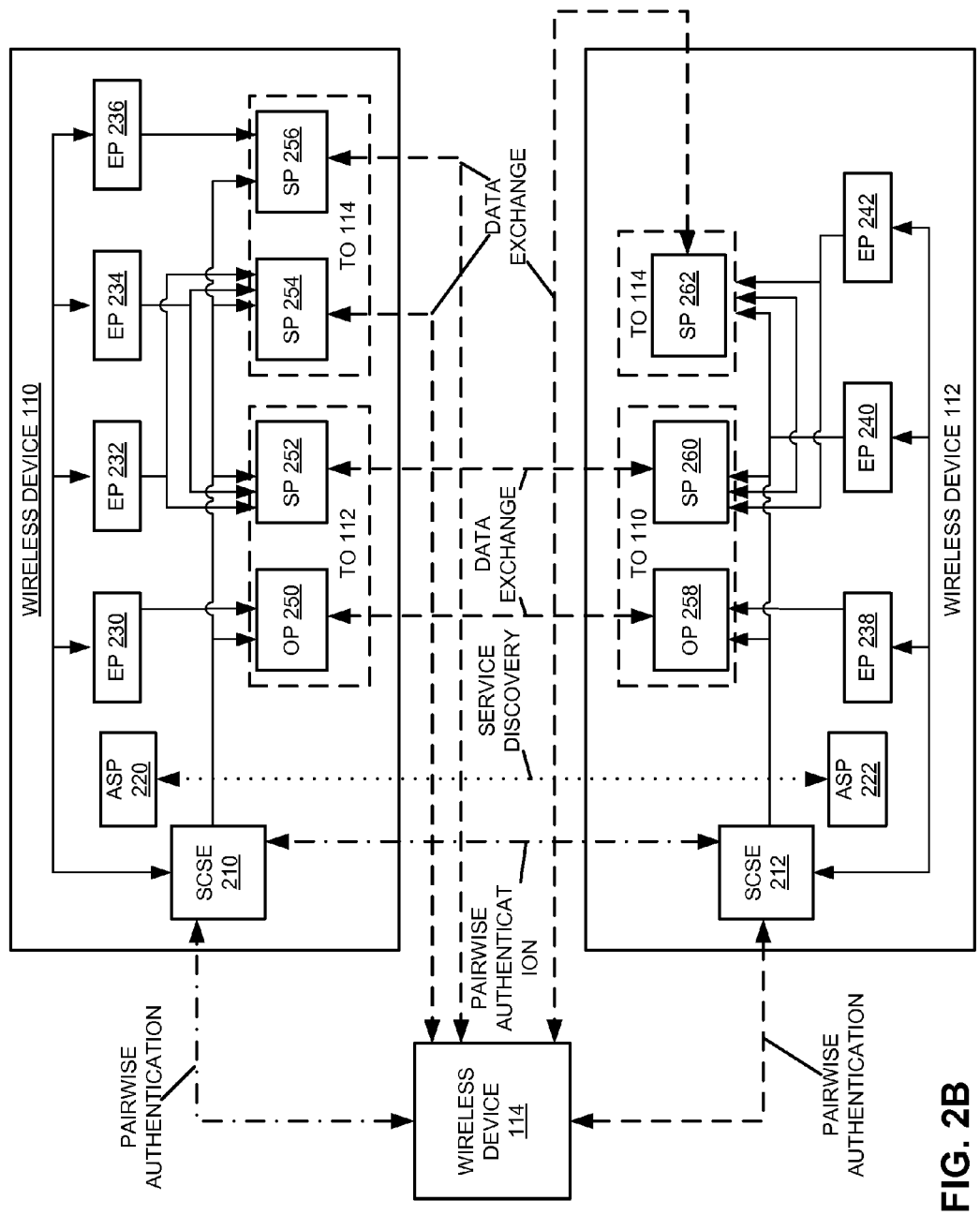
FIG. 2B presents a block diagram of a security architecture.

FIG. 2B provides a block diagram that illustrates an arrangement of software components found within a security architecture in accordance with the disclosed embodiments. The block diagram displays the security architectures of wireless devices 110 and 112, while omitting the security architecture of wireless device 114. The software components shown within wireless devices 110 and 112 implement one or more of the layers within the seven-layer Open Systems Interconnection (OSI) model, which comprises an application layer, a presentation layer, a session layer, a transport layer, a network layer, a data-link layer, and a physical layer. The phrase Transmission Control Protocol/Internet Protocol (TCP/IP) encompasses both the transport layer and the network layer. The data-link layer may comprise the media access control (MAC) layer.

Wireless device 110's application layer comprises service endpoints 230-236. Wireless device 112's application layer comprises service endpoints (EP) 238-242. For the purposes of this disclosure, the term "service" shall refer to an application or service that is designed to execute within the application layer of a device. The term "service endpoint" shall refer to instances of the application or service, wherein multiple instances or "service endpoints" of a single application may execute simultaneously on separate devices. The term "peer service endpoint" refers to a service endpoint of a service whose functionality relies on the exchange of data between service endpoints of the service executing on devices across a network. Examples of service endpoints include: a photo album application that supports transferring images to other devices across a Wi-Fi network, a game application that supports multiplayer game sessions with other devices across a Wi-Fi network, and a word processor that supports printing to wireless printers.

Service endpoints 230 and 238 are peer service instances of a first service. Service endpoints 232 and 240 and a first omitted service endpoint within wireless device 114 are peer service instances of a second service. Service endpoints 234 and 242 and a second omitted service endpoint within wireless device 114 are peer service endpoints for a third service. Finally, service endpoint 236 and a third omitted service endpoint within wireless device 114 are peer service endpoints for a fourth service.

Below the application layer, wireless device 110 comprises service-configurable security entity (SCSE) 210, service discovery module (ASP) 220, a TCP/IP layer (not shown), open port (OP) 250, secured ports (SP) 252-256, and a MAC layer (not shown), while wireless 112 comprises service-configurable security entity 212, service discovery module 222, a TCP/IP layer (not shown), open port 258, secured ports 260-262, and a MAC layer (not shown).

Open ports 250 and 258 and secured ports 252-256 and 260-262 are virtual ports that exist within the devices' data-link layers. These virtual ports are used within the port-based network access control (PNAC) protocol to implement authenticated access within Ethernet and Wi-Fi networks. The PNAC protocol is further described within the Institute of Electrical and Electronics Engineers (IEEE) 802.1X standard. Each virtual port may be associated with a MAC address, which allows remote devices to send data to the port by addressing the data to the port's MAC address.

A Wi-Fi P2P connection between two wireless devices corresponds to a pair of virtual ports. For example, open ports 250 and 258 correspond to an unsecured Wi-Fi P2P connection between wireless device 110 and wireless device 112, while secured ports 252 and 260 correspond to a secured Wi-Fi P2P connection between the same devices. Thus, data exchanged between service endpoints generally crosses a pair of virtual ports: a first virtual port of the sending service endpoint's wireless device and a second virtual port of the receiving service endpoint's wireless device. For example, data transmitted from service endpoint 232 to service endpoint 240 crosses secured ports 252 and 260. Here, to enable service endpoint 232 to establish a datapath with service endpoint 240, security entity 210 may instantiate a new virtual port in wireless device 110's data-link layer, while security entity 212 instantiates a new virtual port in wireless device 112's data-link layer, thereby enabling a wireless connection to be formed across the pair of virtual ports. Alternatively, service endpoints 232 and 240 may establish a datapath across an existing Wi-Fi P2P connection, resulting in a single pair of virtual supports supporting multiple datapaths.

To establish a secured Wi-Fi P2P connection to a remote device, the device's security entity instantiates a secured port. When first initialized, the secured port is in a closed state, which causes the secured port to prevent normal network traffic from entering or leaving the secured port. Until the security entity has (1) authenticated the remote device, and (2) installed an encryption key in the secured port's encryption module, the secured port only accepts security initialization traffic, which may comprise Extensible Authentication Protocol (EAP) and/or Extensible Authentication Protocol over LAN (EAPOL) traffic. After the security entity installs an encryption key into the secured port's encryption module, the security entity sets the secured port to an open state, which causes the secured port to allow normal network traffic to pass. While the secured port is in an open state, the encryption module decrypts incoming network traffic and encrypts outgoing network traffic with the encryption key.

To establish an unsecured Wi-Fi P2P connection to a remote device, the device's security entity instantiates an open port. The open port generally accepts normal traffic and does not encrypt or decrypt network traffic that passes through the open port. Hence, the open port does not need or include an encryption module. Without application-layer encryption, network traffic sent through an open port may be vulnerable to eavesdropping.

As shown in FIG. 2B, open ports 250 and 258 correspond to an unsecured Wi-Fi P2P connection between wireless devices 110 and 112. Secured ports 252 and 260 correspond to a secured Wi-Fi P2P connection between wireless devices 110 and 112. Secured port 254 and a first omitted secured port within wireless device 114 correspond to a first secured Wi-Fi P2P connection between wireless devices 110 and 114. Secured port 256 and a second omitted secured port within wireless device 114 correspond to a second secured Wi-Fi P2P connection between devices 110 and 114. Finally secured port 262 and a third omitted secured port within wireless device 114 correspond to a secured Wi-Fi P2P connection between wireless devices 112 and 114.

Additionally, the unsecured Wi-Fi P2P connection between wireless devices 110 and 112 supports an insecure datapath between service endpoints 230 and 238, the secured Wi-Fi P2P connection between wireless devices 110 and 112 supports a secure datapath between service endpoints 232 and 240 and a secure datapath between service endpoints 234 and 242, the first secured Wi-Fi P2P connection between wireless devices 110 and 114 supports a secure datapath between service endpoint 232 and the first omitted service endpoint and a secure datapath between service endpoint 234 and the second omitted service endpoint, the second secured Wi-Fi P2P connection between wireless devices 110 and 114 supports a secure datapath between service endpoint 236 and the third omitted service endpoint, and the secured Wi-Fi P2P connection between wireless devices 112 and 114 supports a secure datapath between service endpoint 242 and the second omitted service endpoint.

Service discovery modules 220 and 222 are software components that exist below the application layer of a device. On behalf of a local service endpoint executing on a local device, the local device's service discovery module may (1) discover a remote device, and (2) communicate with a remote device's service discovery module to discover peer service endpoints running on the remote device. In some cases, a connection manager module establishes a Wi-Fi P2P connection with the remote device before the service discovery module performs service discovery on the remote device. In other cases, the service discovery module performs service discovery on the remote device before the connection manager module establishes the Wi-Fi P2P connection.

Service configurable security entities 210 and 212 are software components that exist below the application layer of their respective devices. A device's security entity works in tandem with the device's connection manager module to provide service-configurable Wi-Fi P2P connections, to service endpoints. At the request of a local service endpoint, the connection manager may establish a Wi-Fi P2P connection with a remote device, configuring operation parameters of the Wi-Fi P2P connections including connection's data rate and radio modes. Next, the security entity may configure the security configuration of the Wi-Fi P2P connection. As indicated by the arrows between security entity 210 and service endpoints 230-236, a security entity enables a local service endpoint to manage the security configuration of a Wi-Fi P2P connection by communicating security requirements to the security entity. As indicated by the arrows between security entity 210 and security entity 212, once the security entity receives the local service endpoint's security requirements, the security entity negotiates with the remote device's security entity to determine a security configuration that accommodates both the local service endpoint's security requirements and the remote service endpoint's security requirements. Once the security entities agree upon a security configuration, the security entity may perform a number of steps to initialize the Wi-Fi P2P connection's security configuration. These steps may include one or more the following: exchanging authentication information via an out-of-band (OOB) channel or mechanism, generating a credential, exchanging the credential with the remote device, and generating an encryption key from the credential. As indicated by the arrows between security entity 210 and virtual ports 250-256, the security entity is capable of instantiating one or more virtual ports with which to associate a Wi-Fi P2P connection. With regards to existing open ports, the security entity may upgrade the open port to a secured port. In cases where the security entity creates a secured port, the security entity may toggle the secured port's state between open and closed and install one or more encryption keys into the secured port's encryption module.

Figure 10:
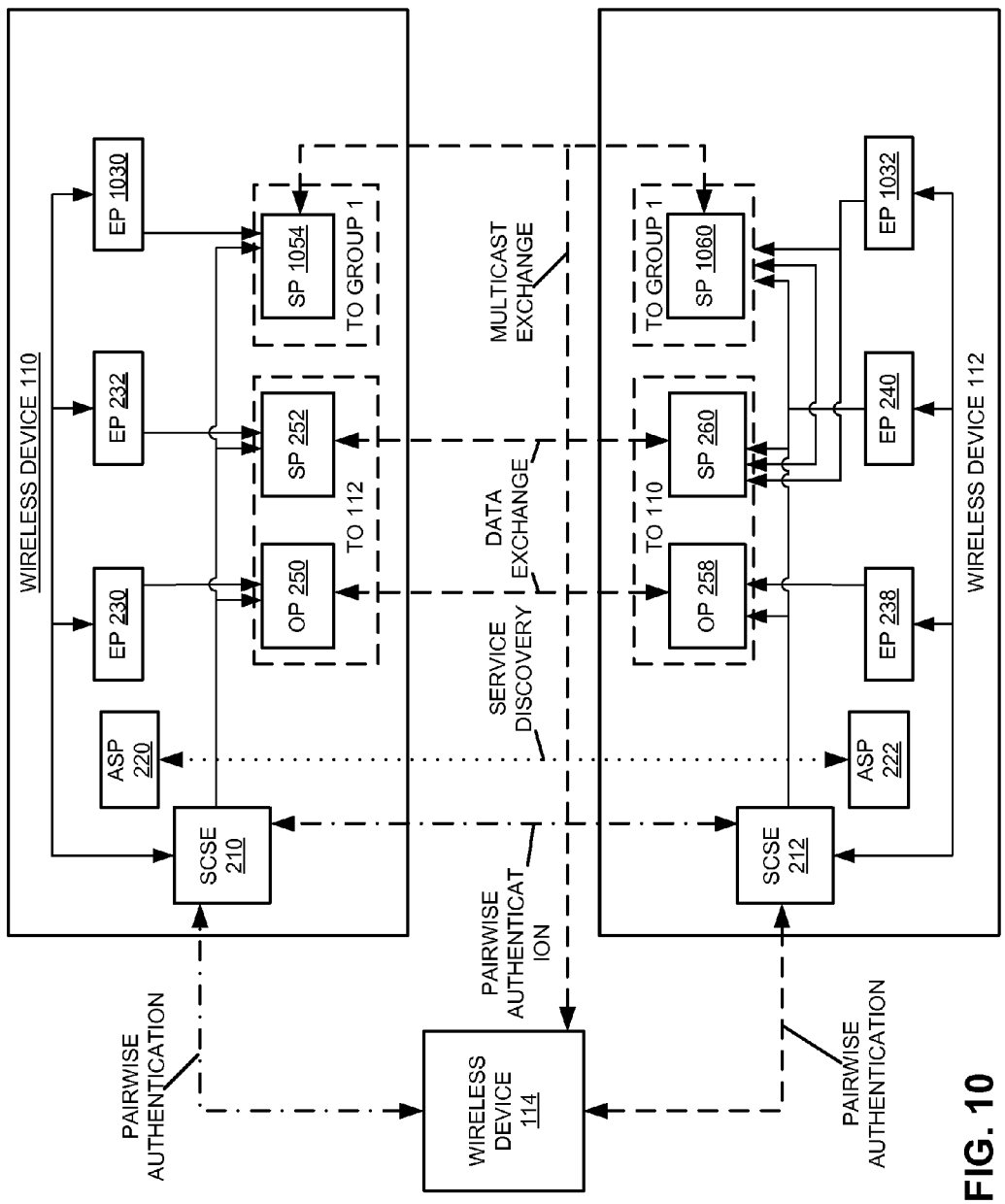
FIG. 10 presents a block diagram of a security architecture.

With regards to service groups, FIG. 10 provides a block diagram that illustrates an arrangement of software components found within a security architecture in accordance with the disclosed embodiments. The block diagram displays the security architectures of wireless devices 110 and 112, while omitting the security architecture of wireless device 114. Unlike FIG. 2B, however, FIG. 10 omits service endpoints 234, 236, and 242 and secured ports 254, 256, and 262 and includes service endpoints 1030 and 1032 and secured ports 1054 and 1060. In this block diagram, service endpoints 230 and 238 are peer service endpoints for the first service. Service endpoints 232 and 240 and a first omitted service endpoint within wireless device 114 are peers for the second service. Service endpoints 1030 and 1032 and a fourth omitted service endpoint within wireless device 114 are service endpoints for a fifth service. Also, while pairwise datapaths between service endpoints associated with the fifth service are omitted, the tri-directional arrow that connects these service endpoints indicates that wireless devices 110, 112 and 114 are members of service group 1.

Service group 1 is a service group created to handle multicast traffic between service endpoints of the fifth service. Generally, a member of a service group may send multicast transmissions to one or more other members of the group simultaneously by addressing the transmission to a MAC address that is associated with a virtual port of each device member of the group. While a Wi-Fi P2P connection generally corresponds to a pair of virtual ports, a service group may correspond to one or more virtual ports, depending on the number of members in the group. For example, service group 1 corresponds to three virtual ports: secured port 1054, secured port 1060, and an omitted secured port within wireless device 114. As with virtual ports that correspond to Wi-Fi P2P connections, a security entity creates and manages virtual ports that correspond to a service group. Secured ports that correspond to a service group also possess an encryption module. In this case, the security entity installs a group key in the encryption module, which the encryption module uses to encrypt outgoing multicast traffic and decrypt incoming multicast traffic. The tri-directional arrow that connects secured port 1054, secured port 1060, and the fourth omitted port represents multicast traffic transmitted among the members of service group 1. More information concerning group keys and the creation of service groups is provided in later sections.

Figure 3:
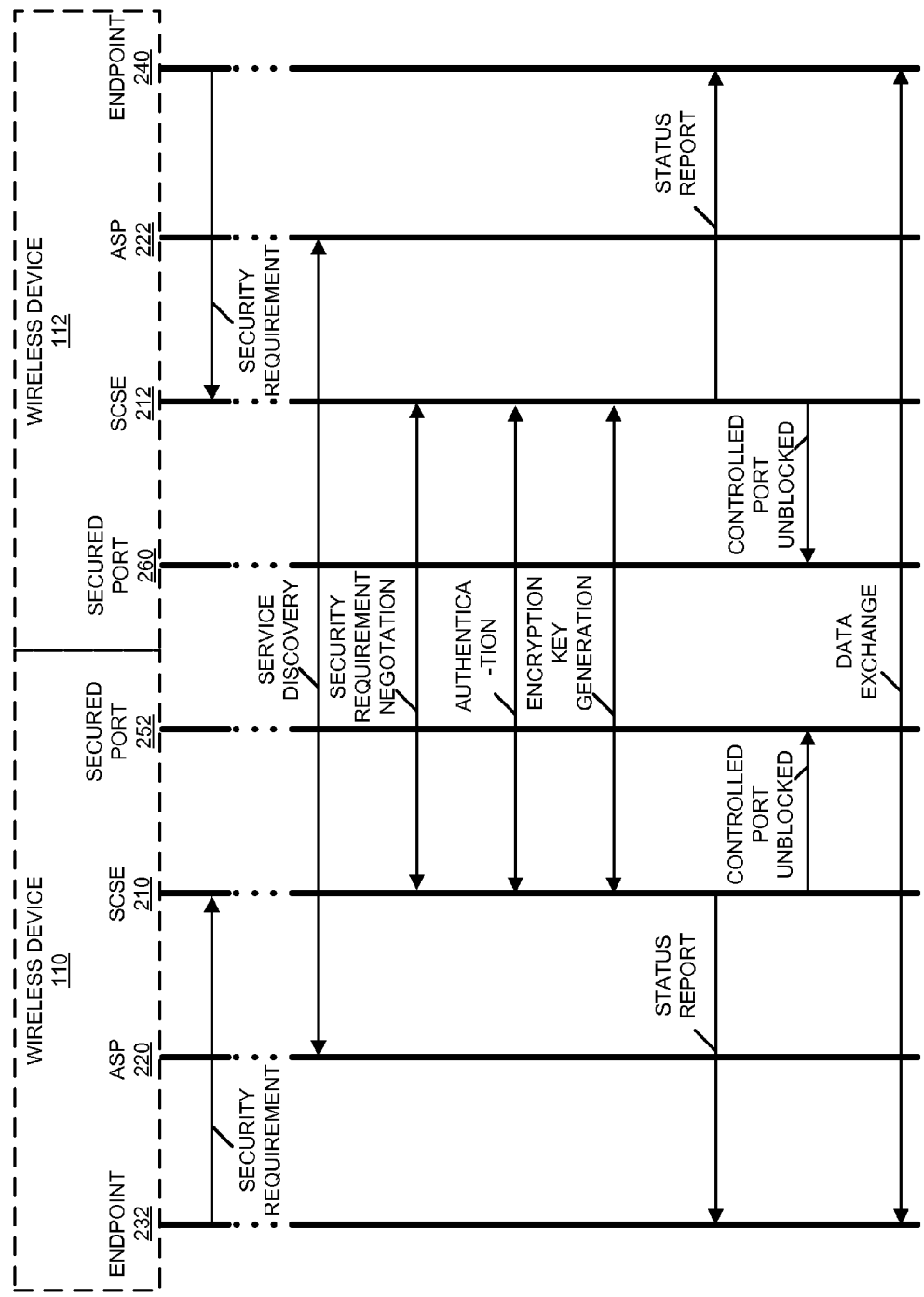
FIG. 3 presents an event diagram illustrating a process of establishing a secure datapath over a service-configurable Wi-Fi connection.

FIG. 3 presents an event diagram illustrating a process of establishing a secure datapath between wireless devices 110 and 112 in accordance with the disclosed embodiments. After service endpoint 232 is started in wireless device 110's application layer, service endpoint 232 communicates service endpoint 232's security requirements to security entity 210. Likewise, after service endpoint 240 is started in wireless device 112's application layer, service endpoint 240 communicates service endpoint 240's security requirements to security entity 212. Next, service discovery modules 220 and 222 begin conducting device and service discovery on behalf of service endpoint 232 and 240, respectively. Because service endpoints 232 and 240 are peer service endpoints for the second service, communications between service discovery modules 220 and 222 eventually determine that service endpoints 232 and 240 are peers. As a result, security entities 210 and 212 begin negotiating with each other to determine a security configuration that will satisfy the security requirements of both service endpoints 232 and 240. Once security entities 210 and 212 determine a suitable security configuration, security entities 210 and 212 perform pairwise authentication, which results in both wireless devices 110 and 112 having the credential associated with the Wi-Fi P2P connection that is being established. Both security entities 210 and 212 use this credential to generate encryption keys. Next, security entity 210 sends a status report to service endpoint 232, informing service endpoint 232 that a secured Wi-Fi P2P connection is to be established with wireless device 112. Likewise, security entity 212 sends a status report to service endpoint 240, informing service endpoint 240 that a secured Wi-Fi P2P connection is to be established with wireless device 110. Security entity 210 then creates secured port 252, installs the generated encryption key in secured port 252, and sets secured port 252's status to open. Likewise, security entity 212 then creates secured port 260, installs the encryption key it generated in secured port 260, and sets secured port 260's status to open. Finally, service endpoints 232 and 240 establish a datapath across secured ports 252 and 260 and begin exchanging data.

Additionally, in an alternative embodiment, service endpoints are given direct control over the authentication process between a local wireless device and a remote wireless device. In this embodiment, service endpoints directly handle (1) the exchange of authentication information via an OOB mechanism between the two devices, (2) the generation of the credential, and (3) the exchange of the credential between the two devices. After the service endpoints have installed the credential in the security entities of both devices, the security entities instantiate virtual ports, generate encryption keys, and install the encryption keys in encryption modules. By granting service endpoints direct control of the pairwise authentication process, the alternative embodiment provides the advantage allowing a multi-radio wireless device to establish secure wireless connections across multiple radios with a common credential.

Wi-Fi Protected Setup

A discussion of the steps for establishing authentication and data encryption within the context of Wi-Fi Protected Setup is now provided. In general, when a device wishes to connect to an infrastructure Wi-Fi network, it contacts the network's access point. Within the context of WPS, the device adopts the role of the enrollee, while the access point adopts the role of the registrar. An enrollee, which can also be referred to as the supplicant, is defined as the device being authorized to join the Wi-Fi network. Meanwhile, the registrar, which can also be referred to as the authenticator, is defined as the device with the authority to issue credentials to enrollees. Once the registrar transfers a credential to the enrollee, the enrollee becomes capable of participating in the network. The credential, also referred to as a Pairwise Master Key (PMK) or a Preshared Key (PSK), is a symmetric key that is bound to a session between the enrollee and the registrar. It should also be noted that the registrar generally issues a different credential to each enrollee admitted into the network. In doing so, the registrar prevents one member of the network from eavesdropping onto traffic sent between the registrar and another member.

Now that both the enrollee and the registrar possess the same credential, both devices may independently generate the same encryption key, also known as a Pairwise Transient Key (PTK), to encrypt and decrypt data sent and received between the devices. Here, the enrollee and the registrar engage in a process known as the four-way handshake to (1) verify the credential, (2) generate the encryption key from the credential, and if needed, (3) transfer a group key to the enrollee. The encryption key, which is also a symmetric key, is never transmitted. In some cases, to strengthen security, the enrollee and the registrar periodically generate a new encryption key.

The group key, which is also known as a Group Temporal Key (GTK), may be used to encrypt data that is sent via multicast transmissions to multiple recipient devices in the network, which may include the enrollee and the registrar. Recipient devices that possess the group key may then use it to decrypt data received in the multicast transmission. Generally, enrollees of a network receive the group key from the registrar via the four-way handshake. However, in situations where the registrar needs to issue a new group key to an enrollee but does not need to update the encryption key, the registrar and the enrollee may engage in a process known as the two-way handshake, which results in transferring the group key to the enrollee without updating the encryption key.

With regards to securely transferring the credential to the enrollee, however, the registrar relies on the transfer of authentication information via an out-of-band (OOB) mechanism. Authentication information may comprise at least one of a Personal Identification Number (PIN) and the public key of a public-private key pair. The PIN may be hardcoded in the enrollee or randomly generated. OOB mechanisms used to exchange authentication information may include any mechanism that verifies the user's physical control of the devices. Examples of OOB settings are provided in a later section. Once the registrar obtains the authentication information, the registrar uses the authentication information to (1) authenticate the enrollee and (2) securely transfer the credential to the enrollee. More specifically, the enrollee may authenticate itself to the registrar by encrypting a shared PIN with the registrar's public key and sending the encrypted PIN to the registrar, thereby enabling the registrar to decrypt the PIN and verify that the enrollee and the registrar have matching PINs. After the enrollee authenticates itself to the registrar and the registrar authenticates itself to the enrollee, the registrar uses the enrollee's public key to securely transfer the credential to the enrollee via an EAP request.

While the usage of authentication information, credentials, and encryption keys still apply in the context of forming a Wi-Fi P2P connection between two wireless devices, the roles of enrollee and registrar become interchangeable between the devices.

Security Requirements

A discussion on the various settings that make up a service endpoint's security requirements is now provided. These settings can be divided into multiple categories.

The first category, pairwise authentication requirements, comprises settings that determine when authentication is required and how authentication can be performed for establishing a Wi-Fi P2P connection between two devices. The second category, data protection requirements, comprises settings that determine whether unicast encryption is required and how data encryption may be initialized. The third category, service group requirements, comprises settings that determine whether multicast encryption is required and how multicast encryption may be initialized.

Before exploring the settings in more detail, it should be noted that a user generally has the ability to access and modify the security requirements for each service endpoint running on the user's device. For example, if the user's device provides a graphical user interface, the user could access a service endpoint's security settings by navigating to a settings menu (e.g., such as a dialog box) provided by the service endpoint. As a result, the user is able to tailor the security requirements of each service endpoint running on her device to her specific needs. In cases where the user's device does not provide a user interface, the user may use a configurator, which contains a user interface, to access and modify the security requirements of a service endpoint executing on the device. For example, the user's device could run an embedded web server that serves a webpage displaying the device's security requirements. Here, the user could use a browser installed on the configurator to access the webpage. Configurators are explained in more detail below. Finally, it should be noted that prior to modification by the user, the security requirements of a service endpoint may default to options and values that are most suitable for the service endpoint.

Pairwise Authentication Requirements

Pairwise authentication requirements found within a service endpoint's security requirements may include the following: whether authentication is required, how authentication may be performed, allowable OOB mechanisms, registrar intent, reusing security resources such as shared authentication information and shared credentials, and credential persistence.

With regards to whether authentication is required, a service endpoint may select one of the following options: (1) authentication cannot be used, (2) authentication is required, and (3) no preference. By specifying the first option, a service endpoint indicates that it does not allow the local device to perform authentication with the remote device when establishing a Wi-Fi P2P connection. By specifying the second option, the service endpoint indicates that it requires the local device and the remote device to authenticate themselves to each other when establishing a Wi-Fi P2P connection. By specifying the third option, the service endpoint lets the device or the remote service endpoint decide whether authentication is used or not.

With regards to how authentication may be performed, a service endpoint may select one of the following options: (1) Peer OOB Authentication (POA), and (2) Device Provisional Protocol (DPP). By specifying POA, the service endpoint indicates that it requires the local device to authenticate directly with the remote device via an OOB mechanism. Using pairwise communication environment 100 of FIG. 1A as an example, wireless device 110 specifies POA within its security requirements. In doing so, when wireless device 110 attempts to establish a Wi-Fi P2P connection with wireless device 112, wireless device 110 requires that the two devices directly exchange authentication information via an OOB mechanism. In some embodiments, POA prefers at least one of the two devices to provide a user interface for the user to perform the OOB mechanism. For example, the PIN mechanism may require one of the devices to provide a screen that can display a randomly generated PIN to the user.

By specifying DPP, the service endpoint indicates that it allows the local device to perform pairwise authentication with the remote device directly or via a third device referred to as a configurator. In situations where neither the local device nor the remote device provides a user interface for enabling an OOB mechanism, DPP enables the user to interact with the user interface of a third device to assist the local and remote devices in performing pairwise authentication. Here, one or both of the local and remote devices may prompt the user to set up a configurator. In other cases, the user may set up the configurator in advance. Using pairwise communication environment 102 of FIG. 1B as an example, wireless device 116, which does not possess a user interface, specifies DPP within its security requirements. In doing so, when wireless device 116 attempts to establish a Wi-Fi P2P connection with wireless device 118, which also does not possess a user interface, wireless device 116 prompts the user to use a configurator to help wireless devices 116 and 118 establish pairwise authentication. If the user decides to use wireless device 120 as a configurator, the user first interacts with wireless device 120's user interface to establish pairwise authentication between wireless device 116 and wireless device 120 via POA. Here, wireless device 116 may notify wireless device 118 to look for wireless device 120 as an available configurator. The user then interacts with wireless device 120's user interface to establish pairwise authentication between wireless device 118 and 120 via POA. Finally, because wireless device 120 has established a first secure datapath with wireless device 116 and a second secure datapath with wireless device 118, wireless devices 116 and 118 can use wireless device 120 as a proxy to authenticate one another and securely exchange credentials. Finally, wireless device 120 can now also act as a configurator for other wireless devices seeking to establish pairwise authentication with one of wireless devices 116 and 118.

With regards to which OOB mechanisms are allowed to establish pairwise authentication, a service endpoint may select one of the following options: (1) a push button mechanism, which involves activating a physical or virtual switch on both the local and remote devices within a short time frame (e.g. 60 seconds) to cause the devices to broadcast and listen for authentication information, (2) a PIN mechanism, which involves entering a PIN obtained from one of the devices into the other device, (3) a Quick Response (QR) mechanism, which involves using a camera function in one of the devices to take a picture of a QR code that encodes the other device's authentication information, (4) a Near Field Communication (NFC) mechanism, which involves placing the devices in close proximity so that the authentication information can be exchanged via NFC, (5) a Universal Serial Bus (USB) mechanism, which involves physically connecting the two devices via a USB cable, and (6) a Bluetooth® low energy (BTLE) mechanism which involves placing the devices in close proximity so that the authentication information can be exchanged via BTLE. Additionally, the local service endpoint may allow the device's security entity to select one or more OOB mechanisms based on the local and remote devices' capabilities, conditions, and requirements. In some embodiments, the local service endpoint may recommend one or more OOB mechanisms for use in operations other than pairwise authentication, such as device discovery and service discovery.

With regards to whether the device should act as the registrar or the enrollee when establishing pairwise authentication, the service endpoint may specify a registrar intent. A registrar intent can be an integer or any sort of value that can be compared with other values to determine which is greater or lesser. By specifying a high registrar intent, the service endpoint indicates that it prefers the local device to act as the registrar when establishing pairwise authentication with the remote device. By specifying a low registrar intent, the service endpoint indicates that it prefers the local device to act as the enrollee instead. When establishing pairwise authentication with a remote device, the local device compares its registrar intent to the remote device's registrar intent value; the device with the higher registrar intent acts as the registrar, while the device with the lower registrar intent acts as the enrollee. If the devices have equal registrar intents, the devices may use a tiebreaker (e.g., comparing MAC addresses of the devices) to determine which device acts as the registrar. In some embodiments, a device's registrar intent can be further modified by or solely derived from the device's capabilities and current conditions. Examples of such conditions include: the device's remaining battery capacity, the current environment, roles played by other service endpoints running on the device.

With regards to reusing shared authentication information associated with existing authenticated sessions, a local service endpoint may specify one or more of the following options: (1) reusing existing authentication information is allowed, (2) reusing existing authentication information is allowed if the information was exchanged using particular OOB mechanisms, and (3) reusing existing authentication information is not allowed. By specifying the first option, the local service endpoint indicates that if the local service endpoint wishes to establish a Wi-Fi P2P connection with the remote device and pairwise authentication has already been established between the local and remote devices on behalf of a second local service endpoint, the local device may reuse authentication information that was exchanged during the pairwise authentication to establish the Wi-Fi P2P connection between the local and remote devices on behalf of the local service endpoint. It should be noted that the local service endpoint and the second local service endpoint may be associated with different services. By allowing the local device to reuse the authentication information, the local service endpoint can skip the OOB authentication information installation process, thereby saving the user the trouble of having to manually intervene. In some embodiments, selecting this option also allows other services to reuse authentication information installed on behalf of the local service endpoint.

By specifying the second option, the local service endpoint indicates that while it allows the local device to reuse authentication information, the local device may only reuse authentication information that was exchanged using certain OOB mechanisms, which are specified by the local service endpoint. Here, OOB mechanisms can be categorized into different security levels. For example, the security level 1 category may comprise a static PIN mechanism. The security level 2 category may comprise the push button mechanism and the BTLE mechanism. The security level 3 category may comprise the NFC mechanism and the QR code mechanism. Then, the local service endpoint may only allow reuse of authentication information that was exchanged using OOB mechanisms above a particular security level.

By specifying the third option, the local service endpoint forbids the reuse of existing authentication information, thereby forcing the local device to always exchange a separate set of authentication information with the remote device. In some embodiments, specifying this option also prevents other service endpoints from reusing authentication information installed on behalf of the local service endpoint. This option may be useful for services with high security standards, such as enterprise-level applications.

With regards to reusing shared credentials associated with existing authenticated sessions, a local service endpoint may specify one of the following options: (1) reusing existing credentials is allowed, and (2) reusing existing credentials is not allowed. By specifying the first option, the local service endpoint indicates that if the local service endpoint wishes to establish a secured Wi-Fi P2P connection with a remote device and a secured Wi-Fi P2P connection with the remote device has already been established on behalf of a different service, the local device may reuse a credential associated with the existing Wi-Fi P2P connection to establish a separate Wi-Fi P2P connection with the remote device on behalf of the local service endpoint. In doing so, the local device is able to entirely skip the authentication process when establishing the second connection. In some embodiments, selecting this option also allows other services to reuse credentials installed on behalf of the local service endpoint. In this case, such a credential would be referred to as a shared device credential because the local service endpoint is potentially sharing the credential with all other service endpoints running on the local device.

By specifying the second option, the local service endpoint indicates that the local device is not allowed to use existing credentials installed on behalf of other services to establish a Wi-Fi P2P connection. The local device is required to use a credential that is specific to the local service endpoint when establishing a Wi-Fi P2P connection on the service endpoint's behalf. In some embodiments, selecting this option also prevents other services from reusing credentials installed on behalf of the local service endpoint. In this case, such a credential would be referred to as a service-specific credential. Using service-specific credentials would be advantageous for services that highly prize security. Finally, it should be noted that, if the local service endpoints permit, a Wi-Fi P2P connection that uses a service-specific credential can still be established using shared authentication information.

With regards to credential persistence, a service endpoint may specify that it supports or does not support credential persistence. If the local service endpoint specifies support for credential persistence, when the local device obtains a credential from establishing pairwise authentication with a remote device, the local device may store the credential across authenticated sessions with the remote device. In other words, after the current authenticated session with the remote device ends, the local device may later reuse the persisted credential to re-establish the Wi-Fi P2P connection with the remote device. In doing so, the local and remote devices may skip the pairwise authentication process and begin initializing data encryption over the Wi-Fi P2P connection.

To persist a new credential, the local device may associate the credential with an id, also known as a Pairwise Master Key ID (PMKID). To generate a PMKID for a credential that is specific to the service that the local service endpoint is associated with, the local device may use the local device's MAC address, the remote device's MAC address, and the name of the service. For example, the service-specific credential PMKID can be generated with the following formula:

PMKID=HMAC-SHA1-128(PMK, service name||remote MAC||local MAC)

wherein "service name" is the name of the service, "remote MAC" is the MAC address of the remote device, and "local MAC" is the MAC address of the local device. This formula generates a hash-based message authentication code (HMAC) by using the SHA1 as the cryptographic hash function, the PMK as the key, and a concatenation of the service name, the remote MAC, and the local MAC as the message. The resulting HMAC is used as the PMKID.

To generate a PMKID for a credential that is specific to a device rather than a service, the local device may use the local device's MAC address, the remote device's MAC address, and either a special service name or a null value. For example, the shared device credential can be generated with the following formula:

PMKID=HMAC-SHA1-128(PMK, "Shared PMK"||remote MAC||local MAC)

wherein the string "Shared PMK" serves as the special service name. Thus, when the local device generates a PMKID for a new credential acquired during pairwise authentication with the remote device, the local device communicates the PMKID to the remote device and uses the PMKID as a key to store the credential within the local device's credential persistence module. The credential persistence module can be implemented in various ways, such as via a database system, a text file, or an Extensible Markup Language (XML) file. The remote device also stores the same credential using the PMKID it received from the local device. After the original authenticated session between the local device and the remote device has ended, if the local device wishes to re-establish the Wi-Fi P2P connection that is associated with the persisted credential with the remote device, the local device can (1) obtain the credential and the credential's PMKID from the credential persistence module, (2) communicate the PMKID to the remote device, thereby enabling the remote device to (3) use the PMKID to retrieve the same credential from the remote device's credential persistence module. As a result, the local and remote devices can re-establish a Wi-Fi P2P connection without undergoing pairwise authentication again.

Data Protection Requirements

Data protection requirements found within a service endpoint's security requirements may include the following: whether data encryption is needed and reusing security resources such as shared encryption keys, encryption module, and virtual ports.

With regards to whether data encryption is required, a service endpoint may select one of the following options: (1) data encryption cannot be used, (2) data encryption is required, and (3) no preference. By specifying the first option, a service endpoint instructs the local device not to establish data encryption on Wi-Fi P2P connections established on its behalf. This option may be useful for services that wish to broadcast information to the public. It should be noted that a service endpoint cannot require authentication to be used but disallow data encryption. By specifying the second option, the service endpoint instructs the local device to establish data encryption on Wi-Fi P2P connections established on its behalf. By specifying the third option, the service endpoint lets the device or the remote service endpoint decide whether data encryption is used or not.

With regards to reusing shared encryption keys associated with an existing Wi-Fi P2P connection, a local service endpoint may specify one or more of the following options: (1) reusing existing encryption keys is allowed, and (2) reusing existing encryption keys is not allowed. By specifying the first option, the local service endpoint indicates that if (1) the local service endpoint wishes to establish a Wi-Fi P2P connection with a remote device, (2) the Wi-Fi P2P connection needs to be encrypted, and (3) an encrypted Wi-Fi P2P connection with the remote device has already been established on behalf of a different service, the local device may reuse the PTK and virtual ports established on behalf of the other service. Here, the local service endpoint may establish its own datapath using the existing encryption keys and virtual ports, thereby allowing the local and remote devices to skip pairwise authentication and the four-way handshake process. In some embodiments, selecting this option also allows other services to reuse encryption keys and virtual ports created on behalf of the local service endpoint. In this case, such encryption keys would be referred to as shared device encryption keys because the local service endpoint is potentially sharing the encryption keys with all other service endpoints running on the local device.

By selecting the second option, the local service endpoint indicates that the local service endpoint will not establish a datapath using existing encryption keys, encryption modules, and virtual ports created on behalf of other services. As a result, local and remote devices are required to engage in the four-way handshake process to generate encryption keys and create encryption modules and virtual ports specifically for the service endpoint. In some embodiments, selecting this option also prevents other services from leveraging encryption keys, encryption modules, and virtual ports created on behalf of the local service endpoint. In this case, such an encryption key would be referred to as a service-specific encryption key. Finally, it should be noted that, if the local service endpoints permit, shared authentication information and/or credentials may still be used to generate a service-specific encryption key.

Service Group Requirements

Service group security requirements found within a service endpoint's security requirements may include the following: type of multicast protection, selection of authorized group members, the distribution of authentication information, group shared authentication information, and group persistence.

With regards to the type of protection required for multicast transmissions, a service endpoint may select one or more of the following options: (1) no encryption, (2) encryption via a group shared key, and (3) encryption via a source-generated key. If the service endpoint specifies the first option, multicast transmissions targeted to the service group can be unprotected. As a result, any device may simply adopt the group's group ID to receive unprotected multicast transmissions that are sent to the group's address. If the service endpoint specifies the second option, multicast transmissions target to the group are required to be encrypted using a group shared key. A group shared key may be a symmetric key that is generated by the service group's founder and shared among all members of the group. Thus, multicast transmissions encrypted with this key can be decrypted by any member of the group because all members possess the same group shared key. Note that, in some cases, a group shared key may remain the same for the group's lifetime. Thus, if the group shared key is compromised, multicast transmissions from all members of the service group become vulnerable. To strengthen security even further, the service endpoint may select the third option, which requires multicast transmissions to be protected by the multicast transmitter's source-generated key. Each service group member that plans to multicast generates its own source-generated key and securely delivers that key to each intended multicast recipient. A given service group member may possess multiple source-generated keys: one from each multicast transmitter for whom the service group member is an intended recipient. Thus, even if a particular source-generated key is compromised, only multicast transmissions from the source-generated key's corresponding source will be vulnerable. It should be noted that a service endpoint's security requirements may specify more than one of the three options to protect multicast transmissions. If the service endpoint's security requirements specify more than one of these three options, the security entity of the local device may choose from the selected options.

If the service endpoint is running on a device that will found a group, the service endpoint's security requirements will (1) regulate security configurations for Wi-Fi P2P connections between members of the group and (2) security configurations for transmitting multicast transmissions within the group. Based on the service endpoint's security requirements, the group founder may (1) require member devices to use source-generated keys to protect multicast transmissions, (2) require member devices to use a group shared key protect multicast transmissions, (3) allow member devices to choose from a subset of the three options, or (4) allow member devices to choose from any of the three options.

For local devices that found a service group for a local endpoint,

With regards to which members are authorized group members, a service endpoint may select one or more of the following options: (1) the group founder has authorized group member status, (2) authorized group member status is rotated among group members, (3) authorized group member status is granted to specific group members, and (4) authorized group member status is granted to all group members. An authorized group member is a member of a service group that is authorized to perform one of the following functions: advertise the service group to new devices, admit new devices into the group, and pass group security requirements to new devices. If a group shared key has been generated, the authorized group member may transmit the group shared key to new devices as well. The first option only grants authorized group member status to the device that founded the group. With the second option, authorized group member status is periodically rotated among group members. With the third option, authorized group member status is granted to specifically selected members, which may be selected by one of the founder device, the user, and a distributed or autonomous algorithm. With the fourth option, all group members are authorized group members.

With regards to how authentication information may be distributed among group members to establish pairwise authentication, a service endpoint may allow authorized group members to (1) forward existing members' authentication information to a newly joined member, and (2) forward a newly joined member's authentication information to other members. This option aims to allow a group member, which has been newly admitted to a service group by pairwise authentication with an authorized group member, to quickly pairwise authenticate with the rest of the members in the service group. Rather than having to exchange authentication information via an OOB mechanism for every other group member, this option allows the authorized group member, with which the new member just pairwise authenticated, to forward authentication information to members, thereby enabling the new member to skip the OOB process when pairwise authenticating with the other members. This is especially useful when a new member needs to transfer its source-generated key to other group members.

With regards to group shared authentication information, a service endpoint may allow or forbid the use of group shared authentication information. By enabling this option, the founding device may generate (or prompt the user to generate) group shared authentication information and shared the information with all group members. Note that, in some cases, the group shared information remains the same for the group lifetime. After obtaining the group shared authentication information from an authorized group member via pairwise authentication, a new member can skip the OOB process when pairwise authenticating with other group members by using group shared authentication information instead of a device's own authentication information to exchange credentials. As with authentication information forwarding, group shared authentication information is especially useful when a new member needs to transfer its source-generated key to other group members.

With regards to group persistence, a service endpoint may select one or more of the following options: (1) allowing the persistence of a group shared key or group shared authentication material, and (2) allowing the persistence of a source-generated key. If the group uses a group shared key to protect multicast transmissions, the group founder may enable the first option to create a persistent service group by allowing group members to persist the group shared key in its credential storage mechanism, even after the group member leaves the group or the group terminates. Here, the group shared key remains the same for the life of the group. After the group terminates, any device that was an authorized group member may restart the same persistent group by advertising the group's ID and using the persisted group shared key. Likewise, any device that was a group member may immediately use the stored group shared key to transmit protected multicast transmissions to the group. Devices that were not formerly group members may obtain the group shared key by simply joining the service via pairwise authentication with an authorized group member.

If the group uses group shared authentication information, then the group founder may enable the first option to create a persistent service group by allowing group members to persist the group shared authentication information. Here, the group shared authentication information remains the same for the life of the group. After the group terminates, any device that was an authorized group member may restart the same persistent group by advertising the group's ID and using a new group shared key, wherein the new group shared key is exchanged with other former group members using the persisted group shared authentication information, thereby bypassing the OOB process. In cases where the group formerly used source-generated keys instead a group shared key, a former group member that stored the group shared authentication information may generate a new source-generated key and use the authentication information to pairwise authenticate with other members to exchange the new source-generated key without performing the OOB process.

If a device that is a member of a group that uses source-generated keys selects the second option, the device indicates that any group member that received the device's source-generated key can persist the key in its credential storage mechanism. Here, the device's service interface address and source-generated key remain the same for the life of the group. After the group's termination, if a group member receives a multicast transmission from that service interface address, it may retrieve the persisted source-generated key to decrypt the transmission.

Process of Establishing a Datapath

Figure 4:
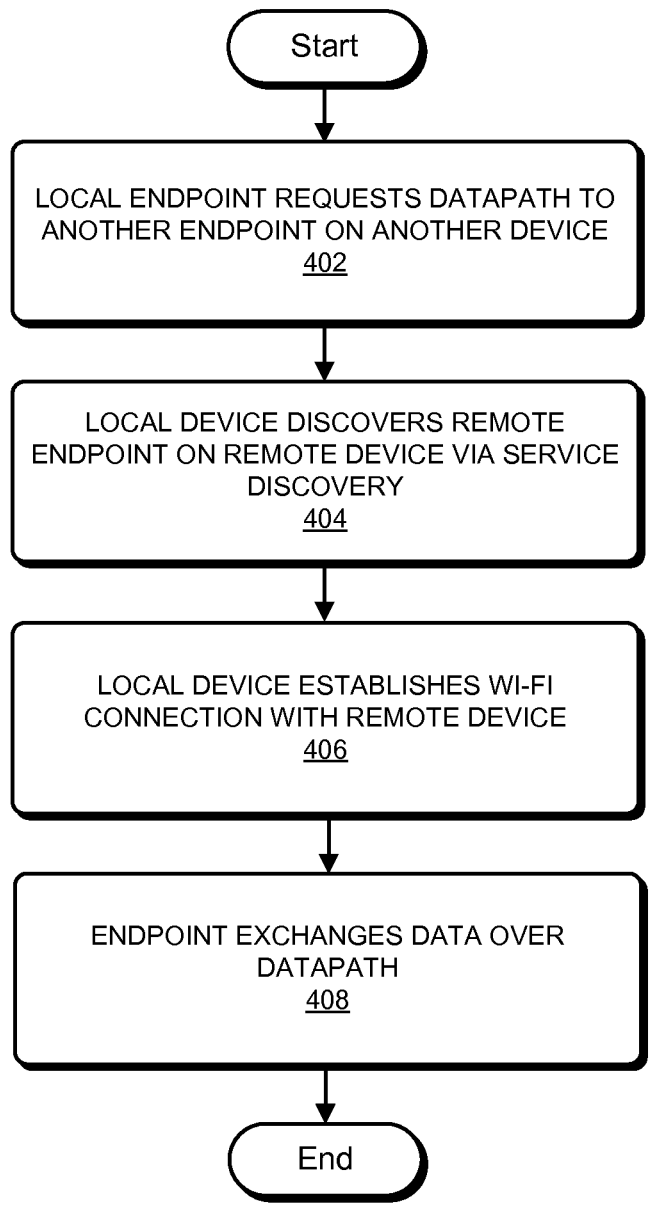
FIG. 4 presents a flowchart illustrating a process of establishing a datapath over a service-configurable Wi-Fi connection.
Figure 5:
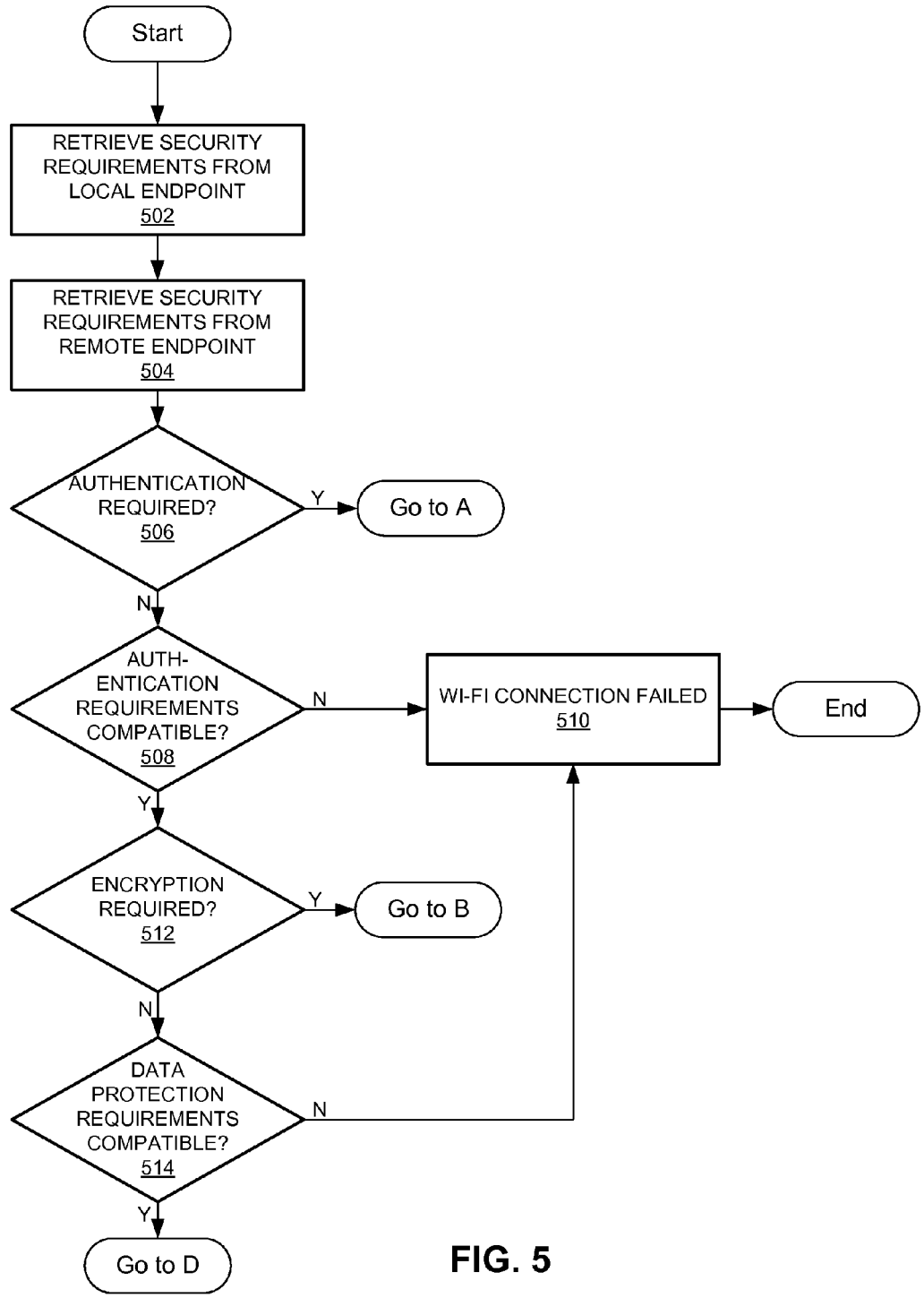
FIG. 5 presents a flowchart illustrating a process of determining a security configuration for a Wi-Fi connection based on service security requirements.
Figure 6:
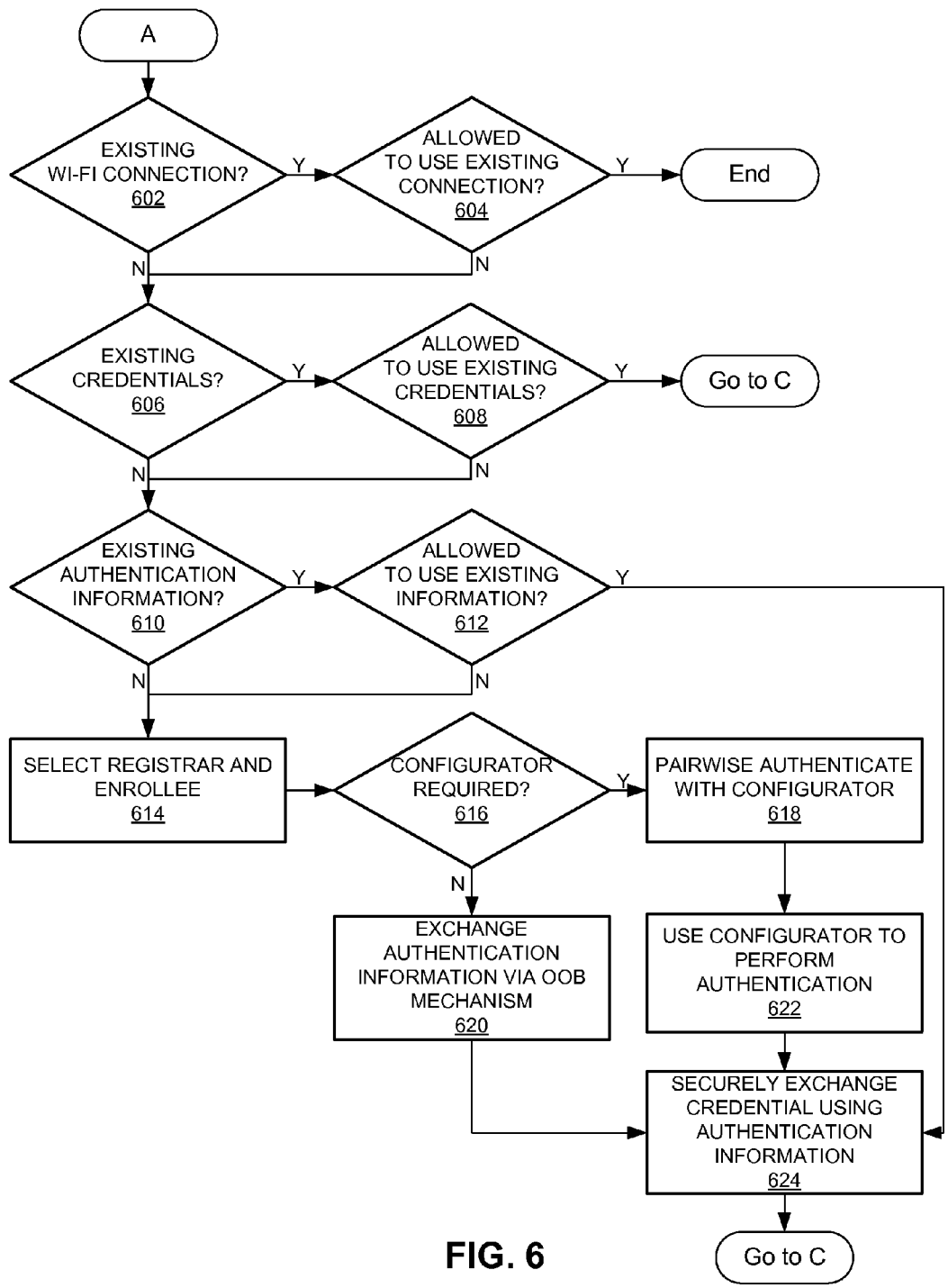
FIG. 6 presents a flowchart illustrating a process of pairwise authentication between two devices.
Figure 7:
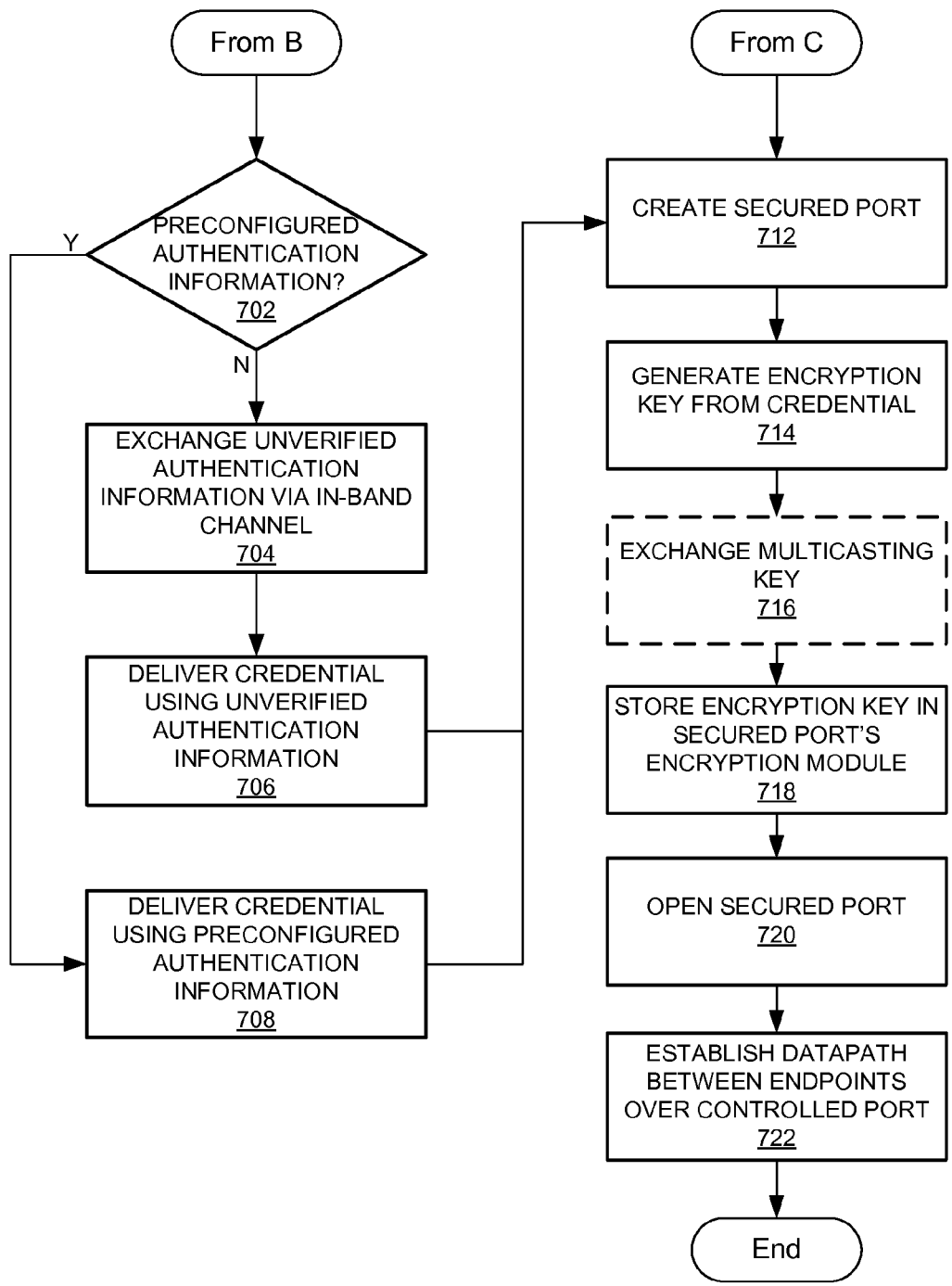
FIG. 7 presents a flowchart illustrating a process of data encryption between two devices.

FIGS. 4-8 illustrate a number of variations on how a local service endpoint executing on a local device may establish a pairwise datapath with a remote service endpoint executing on a remote device. In particular, the flowchart in FIG. 4 provides a high-level overview of the process. FIG. 5 focuses on how the process may vary with regards to security requirements of both the local service endpoint and the remote service endpoint. FIG. 6 illustrates in detail how the devices perform pairwise authentication to establish a secured Wi-Fi P2P connection. FIG. 7 focuses on a number of ways the devices may configure data encryption across a Wi-Fi P2P connection. Finally, FIG. 8 focuses on how the devices would establish an unsecured Wi-Fi P2P connection.

As shown in the flowchart of FIG. 4, the process begins with the local service endpoint notifying the local device's security entity that it intends to establish a datapath with another service endpoint executing on another device (operation 402). The local service endpoint may transmit the notification when it first starts executing on the device. In some embodiments, the local service endpoint may inform the security entity of its intention to establish a datapath by sending its security requirements to the security entity.

It should be noted that a plurality of disparate applications can support a single service. In other words, an application that serves as a service endpoint can establish pairwise datapaths with a different type of application so long as both applications support the application-layer protocol behind the service. For example, a photo album application may establish pairwise datapaths with an instance of a different application (such as a webpage design application), so long as both applications support the photo-sharing service.

Assuming that the local service endpoint supports a first service, once the local device comes within range of a remote device, the local device's service discovery module may negotiate with the remote device's service discovery module to determine a remote service endpoint that supports the first service running on the remote device (operation 404). If so, the security entity may attempt to establish a Wi-Fi P2P connection with the remote device. If not, the service discovery module may continue performing service discovery on other remote devices that enter into range.

Once a peer service endpoint is found on the remote device, the security entity establishes a Wi-Fi P2P connection with the remote device (operation 406). Eventually, the local service endpoint may establish a datapath with the remote service endpoint over the Wi-Fi P2P connection established by the security entity and use the datapath to exchange data with the remote service endpoint (operation 408). The flowcharts in FIGS. 5-8 expand upon operation 406. Note that the ordering of steps within these flowcharts is not to be construed as limiting. Rather, the steps are listed in the displayed order for purposes of providing an example in accordance with the disclosed embodiments.

Negotiating Authentication and Data Protection Preferences

Referring to the flowchart in FIG. 5, once the security entity receives the local service endpoint's security requirements (operation 502) and determines that the service discovery module has discovered a remote service endpoint at the remote device that supports the same service as the local service endpoint, the security entity communicates with the remote device's security entity to obtain the remote service endpoint's security requirements (operation 504). In some embodiments, the security entity determines the remote service endpoint's security requirements as it negotiates with the remote security entity. In either case, the security entity and the remote security entity begin negotiating with each other to determine a Wi-Fi security configuration that accommodates both the local service endpoint's security requirements and the remote service endpoint's security requirements.

The security entities first compare authentication requirements to determine whether authentication is required for the Wi-Fi P2P connection (decision 506). Authentication is required when (1) both service endpoints require authentication, or (2) one service endpoint requires authentication, while the other service endpoint specifies no preference. Authentication is not required when (1) both service endpoints forbid authentication, (2) one service endpoint forbids authentication and one service endpoint specifies no preference, or (3) both service endpoints specify no preference. Authentication requirements are found to be incompatible between the two service endpoints if one of the service endpoints requires authentication while the other service endpoint forbids authentication.

If it is determined that authentication is required, the security entity assumes that data encryption is also required and the process continues to starting point A of the flowchart in FIG. 6. There, the devices will undergo pairwise authentication and generate encryption keys from the resulting credential. If the authentication requirements are found to be incompatible between the two service endpoints (decision 508), the Wi-Fi P2P connection attempt fails and the security entity notifies the local service endpoint of the failure (operation 510).

Even if it is determined that authentication is not required, the devices may still implement data encryption through the use of default or unverified authentication information. Thus, the security entities still compare data protection requirements to determine whether data encryption is required (decision 512). Data encryption is required when (1) both service endpoints require data encryption, or (2) one service endpoint requires data encryption while the other service endpoint specifies no preference. Data encryption is not required when (1) both service endpoints forbid data encryption, (2) one service endpoint forbids data encryption and one service endpoint specifies no preference, or (3) both service endpoints specify no preference. Data encryption requirements are found to be incompatible between the two service endpoints if one of the service endpoints requires data encryption while the other service endpoint forbids data encryption.

If it is determined that data protection is required, the process continues to starting point B of the flowchart in FIG. 7. There, the devices will initialize data encryption using preconfigured or unverified authentication information. If data encryption requirements are found to be incompatible between the two service endpoints (decision 514), the Wi-Fi P2P connection attempt fails and the security entity notifies the local service endpoint of the failure (operation 510).

Establishing Pairwise Authentication

Referring to the flowchart of FIG. 6, if it is determined that authentication is required for the Wi-Fi P2P connection, the security entity first determines whether an existing Wi-Fi P2P connection, complete with its own encryption keys and secured ports, is already available for reuse (decision 602). In making this determination, the security entity may additionally ensure that the Wi-Fi P2P connection was not initialized using preconfigured or unverified authentication information. If an existing reusable Wi-Fi P2P connection is available, the security entity compares authentication preferences with the remote security entity to determine whether both service endpoints support the reuse of existing Wi-Fi P2P connections and encryption keys (decision 604). If so, the security entity notifies the local service endpoint of the existing Wi-Fi P2P connection, thereby enabling the local service endpoint to establish a datapath with the remote service endpoint over the existing Wi-Fi P2P connection. Otherwise, the process continues down the flowchart.

The security entity then determines whether the local device already possesses a credential from a previously established Wi-Fi P2P connection with the remote device (decision 606). The security entity may query the device's credential persistence mechanism to determine whether a persisted shared-device credential or a persistent credential that is specific to the local service endpoint's service exists. Additionally, the security entity may determine whether a shared-device credential that is associated with an existing Wi-Fi P2P connection between the local and remote devices is available for reuse. If the security entity finds a reusable credential from one of these sources, the security entity then compares authentication preferences with the remote security entity to determine whether reusing the credential is permitted (decision 608). To determine whether a persisted credential that is specific to the service supported by the local and remote service endpoints can be reused, the security entities determine whether both service endpoints support persistent credentials. To determine whether a shared device credential can be reused, the security entities determine whether both service endpoints allow the reuse of shared device credentials. To determine whether a persisted shared device credential can be reused, the security entities determine whether the service endpoints both support persistent credentials and allow the reuse of shared device credentials. If the security entities determine that the service endpoints permit reusing the existing credential, then the devices skip pairwise authentication and proceed to starting point C of the flowchart in FIG. 7. There, the devices use the existing credential to establish data encryption. Otherwise, the process continues down the flowchart.

The security entity then determines whether the local device already possesses authentication information from a pairwise authentication that was previously performed with the remote device (decision 610). For example, authentication information for the remote device may have been installed on behalf of a different pair of service endpoints running on the devices. If existing authentication information is found, the security entities compare authentication preferences to determine whether both devices support reusing existing authentication information (decision 612). If so, the process skips to operation 624, where the security entities reuse the existing authentication information to securely exchange the credential between the local and remote devices. If one or both of the service endpoints only support reusing authentication information that was exchanged via certain OOB mechanisms and neither of the service endpoints forbids the reuse of authentication information, the security entities determine whether the authentication information was exchanged using an OOB mechanism that is acceptable for both service endpoints. If so, the process also skips to operation 624. Otherwise, the process continues down the flowchart.

Now that the security entities have determined that pairwise authentication is to be performed between the local and remote devices, the security entities first exchange registrar intents to determine which device acts as the registrar and which device acts as the enrollee (operation 614).

If a configurator is required (decision 616), the security entity may instruct the local device's user to establish pairwise authentication between the local device and the configurator (operation 618) and establish pairwise authentication between the remote device and the configurator. Next, the configurator may be used as a secure proxy to perform pairwise authentication between the local and remote devices (operation 622).

If a configurator is not required, the security entity negotiates with the remote security entity to select an OOB mechanism that satisfies both service endpoints. Once the OOB mechanism is determined, the security entity instructs the user to exchange authentication information between the devices using the selected OOB mechanism (operation 620). Finally, once the devices have authenticated themselves to each other using the authentication information, the device acting as the registrar generates a credential and securely transfers the credential to the device acting as the enrollee. In some embodiments, the registrar may encrypt the credential with the enrollee's public key before transferring the credential to the enrollee. Finally, the process continues at the starting point in the flowchart of FIG. 7.

Establishing Data Protection

Referring to the flowchart of FIG. 7, if it is determined that authentication will not be used but data encryption will be used, the process begins from starting point B of the flowchart.

If the preconfigured authentication information is already provided within the devices (decision 702), then the devices may generate and exchange a credential using the preconfigured authentication information (operation 708). Alternatively, the devices may exchange unverified authentication information via an in-band channel, such as via a Wi-Fi transceiver (operation 704). Next, the devices may generate and exchange a credential using the unverified authentication information (operation 706). Once both devices possess the credential, the devices proceed to establish data encryption.

Next, the security entity instantiates a secured port with an encryption module within the local device's data-link layer (operation 712). The secured port is initially set to be closed. Here, the device assigns a shared security interface address to the secured port. The device may use the device's MAC address or obtain a virtual interface MAC address to use as the shared security interface address, so long as the shared security interface address is unique. In some embodiments, if the security entity has already created an open port for an unsecured Wi-Fi P2P connection between the local and remote devices on behalf of another service endpoint, the security entity may upgrade the open port to a secured port. Upgrading the open port to a secured port may comprise adding an encryption module to the open port and blocking the resulting secured port prior to installing an encryption key.

The security entities then perform the four-way handshake to verify the credential and to generate an encryption key from the credential (operation 714). In some situations, the devices utilize the four-way handshake to exchange multicasting credentials (operation 716), which are credentials used to encrypt and decrypt multicast transmissions.

After generating the encryption key, the security entity stores the encryption key within the secured port's encryption module (operation 718) and sets the secured port to an open state (operation 720), thereby enabling the secured port to start accepting normal traffic. Finally, the security entity notifies the local service endpoint of the newly established Wi-Fi P2P connection, thereby allowing the local service endpoint to establish a secured datapath with the remote service endpoint across the Wi-Fi P2P connection (operation 722).

Establishing an Insecure Datapath

Figure 8:
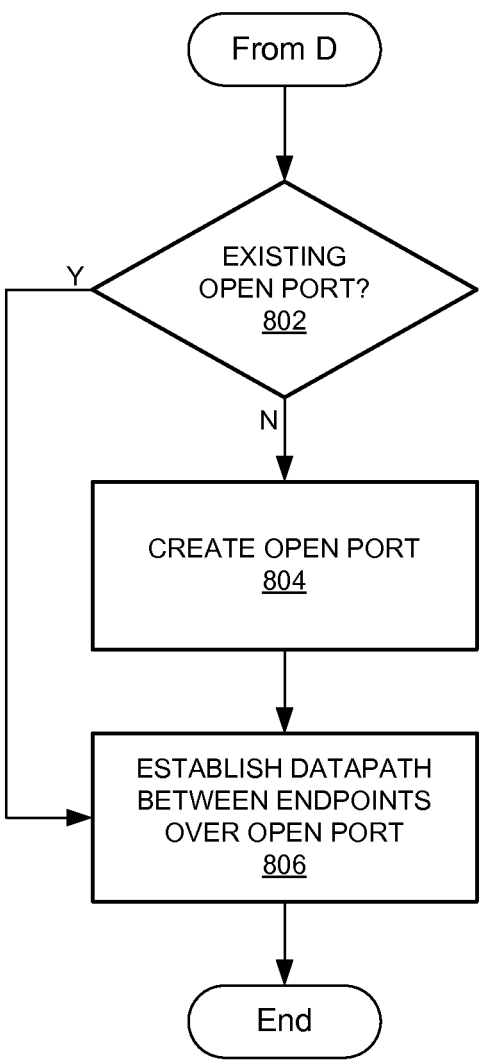
FIG. 8 presents a flowchart illustrating a process of establishing an unsecured Wi-Fi connection between two devices.

Referring to the flowchart of FIG. 8, if it is determined that neither authentication nor data encryption will be used for the Wi-Fi P2P connection, the security entity first determines whether an open port has already been instantiated within the local device's data-link layer (decision 802). If an open port is available, the security entity may reuse the unsecured Wi-Fi P2P connection associated with the open port. Otherwise, the security entity instantiates an open port and establishes an unsecured Wi-Fi P2P connection with the remote device on behalf of the local service endpoint (operation 804). Finally, the security entity notifies the local service endpoint of the unsecured Wi-Fi P2P connection, thereby enabling the local service endpoint to establish an insecure datapath over the Wi-Fi P2P connection (operation 806).

Processes for Managing a Service Group

Figure 11:
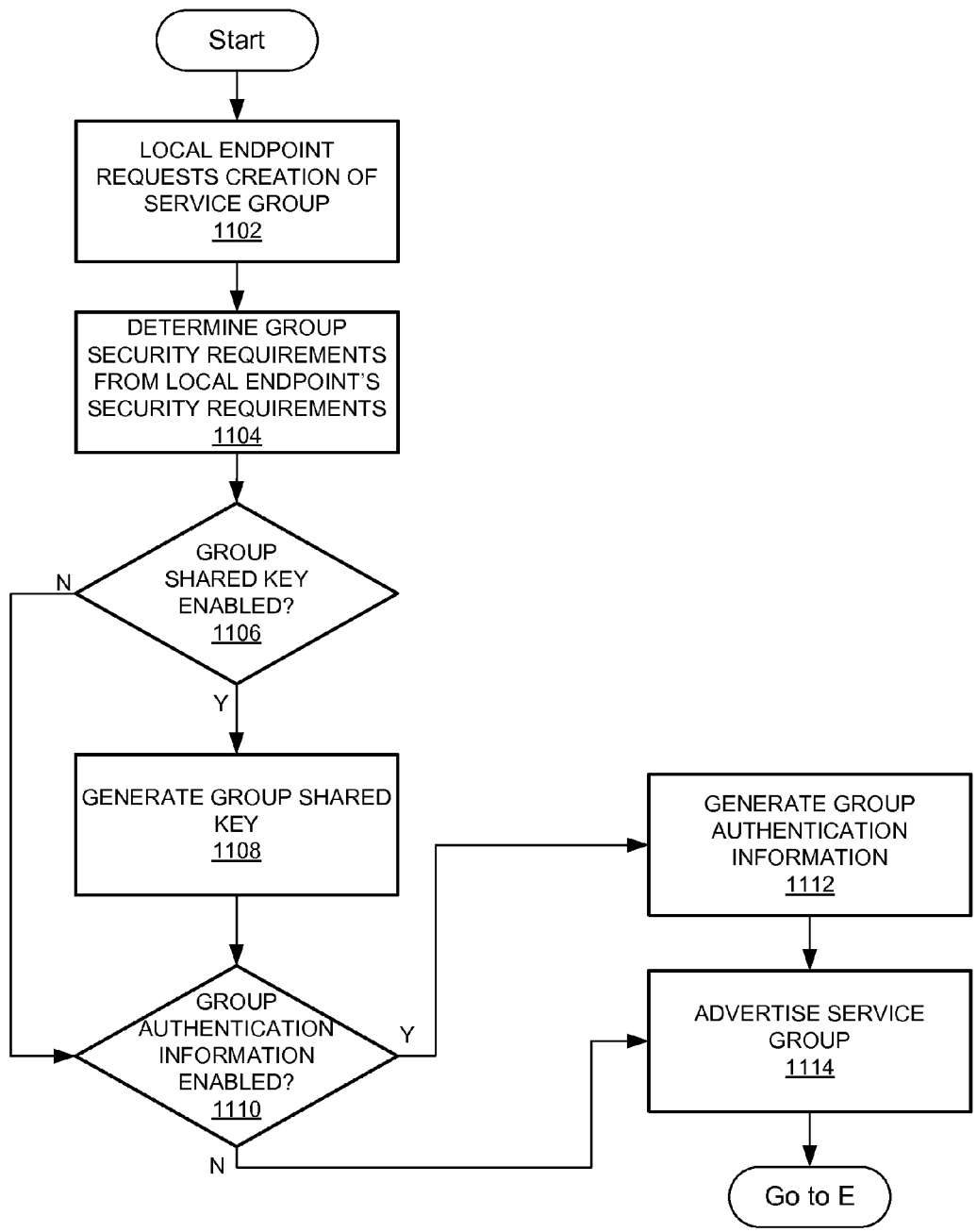
FIG. 11 presents a flowchart illustrating a process of establishing a service group.
Figure 12:
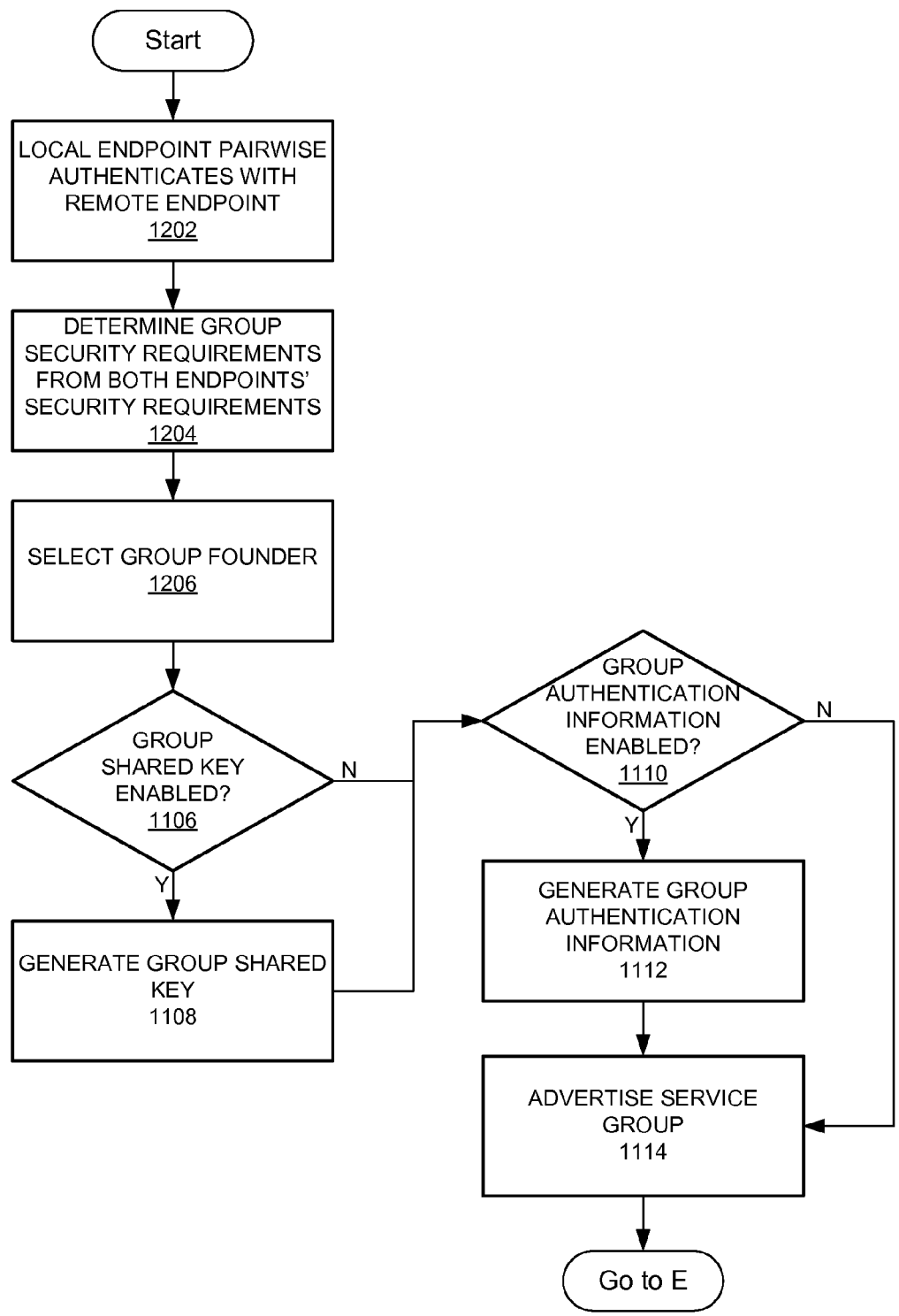
FIG. 12 presents a flowchart illustrating a process of establishing a service group.
Figure 13:
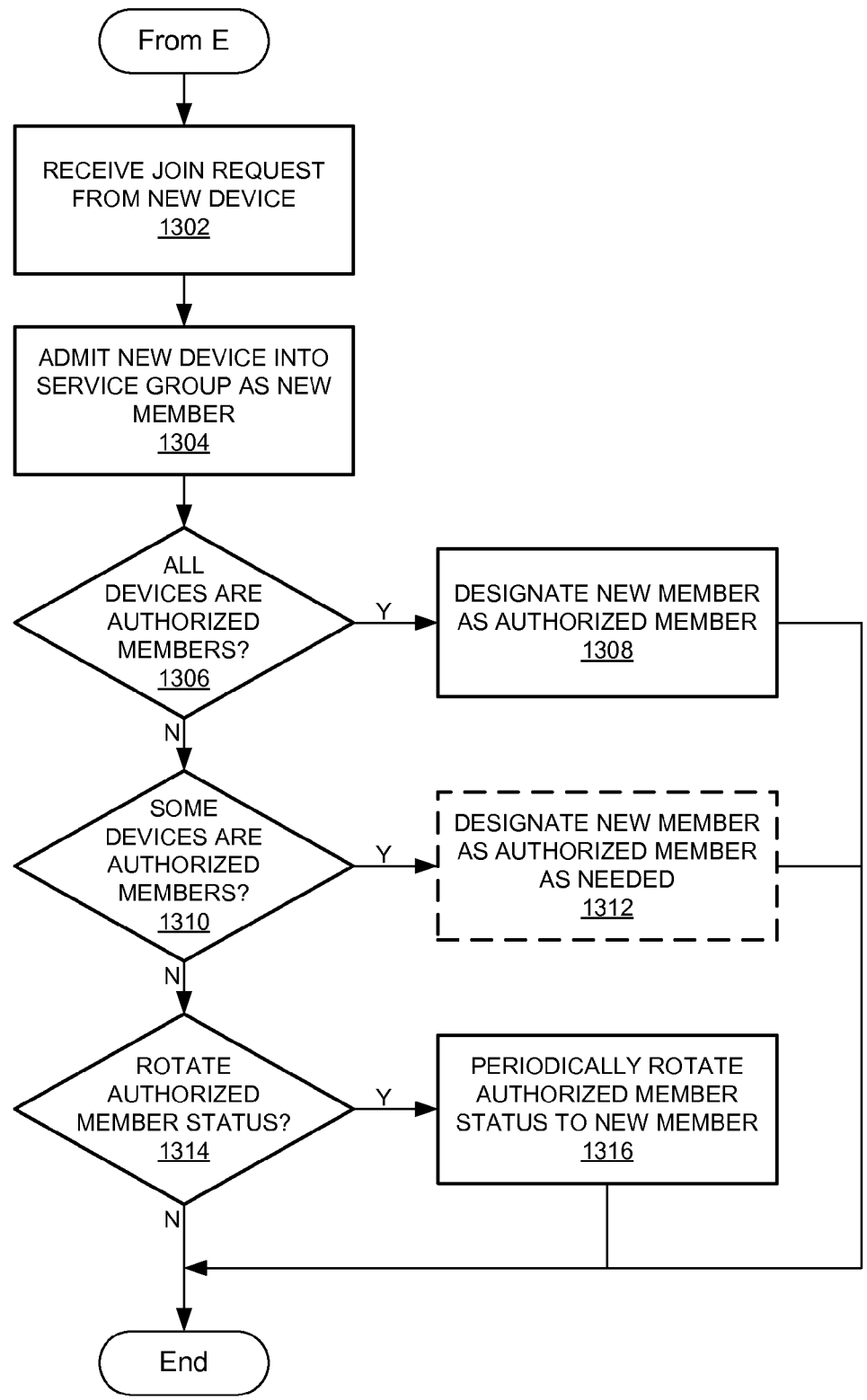
FIG. 13 presents a flowchart illustrating a process of admitting a new device into a service group.
Figure 14:
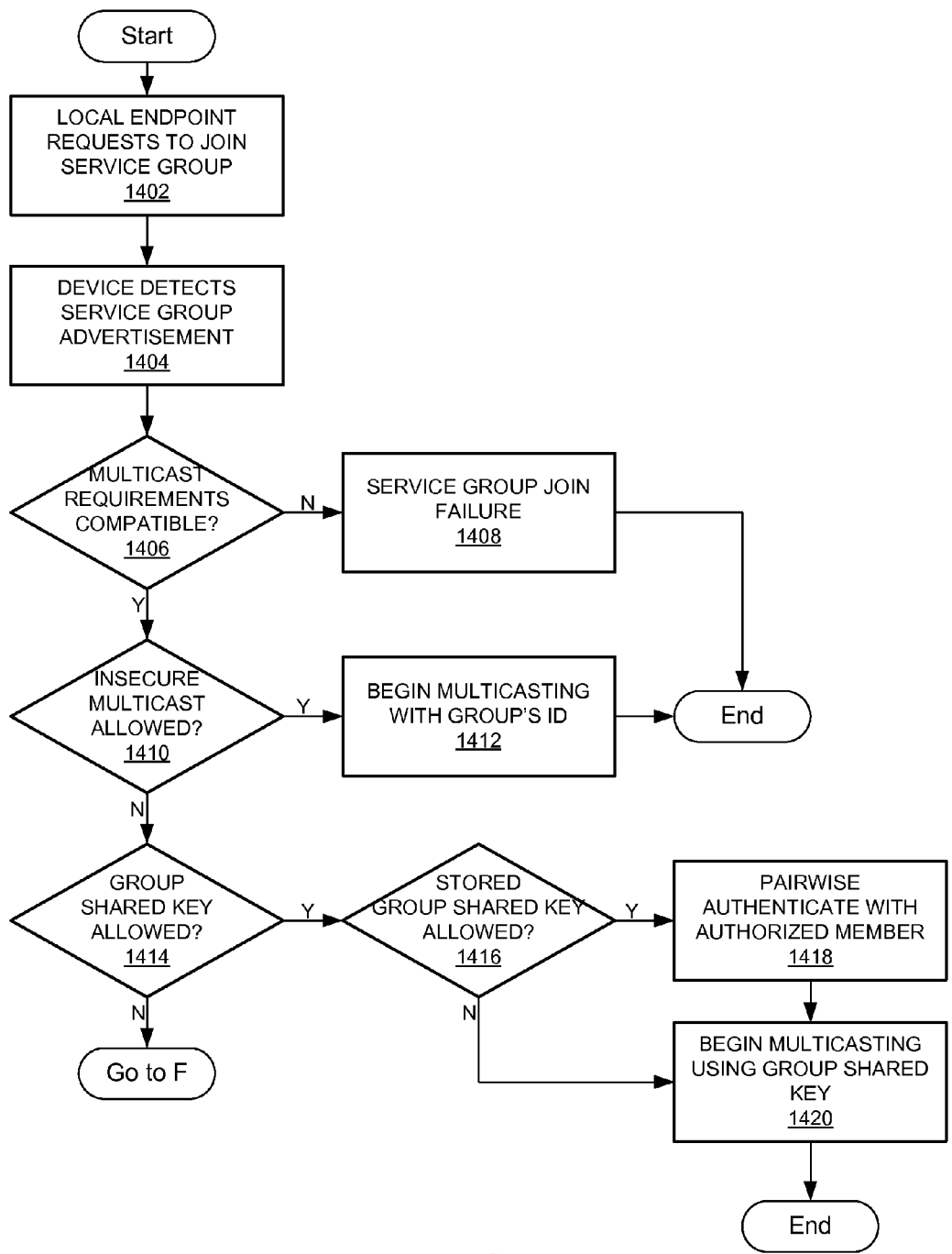
FIG. 14 presents a flowchart illustrating a process of joining a service group.
Figure 15:
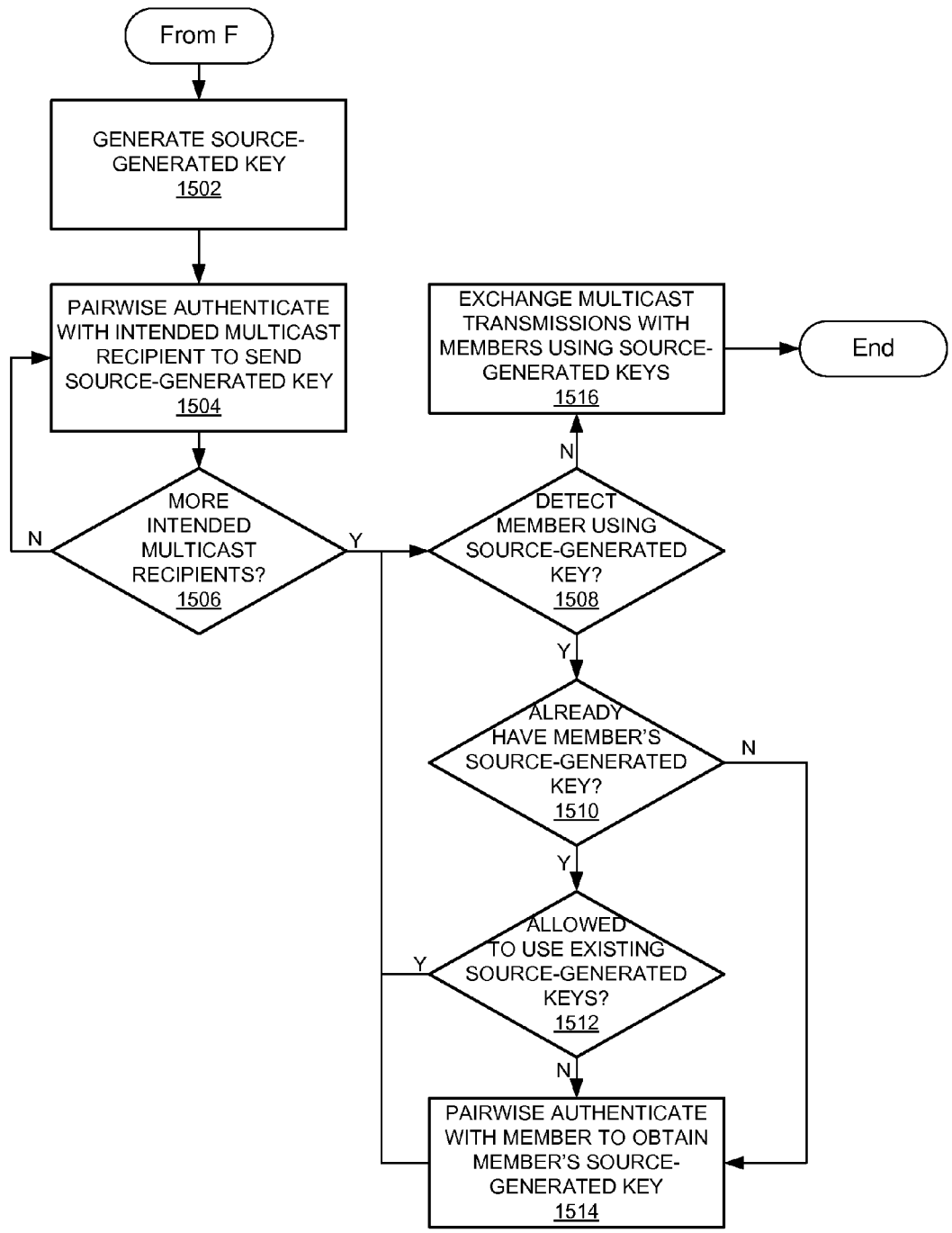
FIG. 15 presents a flowchart illustrating a process of exchanging source-generated keys among members of a service group.

FIGS. 11-15 illustrate a number of processes for managing a service group. In particular, the flowcharts in FIGS. 11 and 12 illustrate the process for founding a service group. The flowchart in FIG. 13 illustrates the process of admitting a new device into the service group. Finally, FIGS. 14-15 illustrate the process of joining a service group.

Founding a Service Group

A local device may found a service group in response to (1) receiving an instruction to found a service group from a service endpoint, and (2) pairwise authenticating with at least one remote device on behalf of a service endpoint. The flowchart in FIG. 11 illustrates the first variation. Once a local service endpoint begins running on a local device, it may instruct the device's security entity to found a service group specific to the service with which the service endpoint is associated (operation 1102). In some cases, receiving service requirements from the service may cause the security entity to found the group. In other cases, the security entity receives the service endpoint's security requirements before or after the service endpoint instructs the security entity to found the group. If the local service endpoint has not established a pairwise datapath with another remote service endpoint, the security entity consults only the local service endpoint's security requirements to determine the group's security requirements (operation 1104). Once determined, the group's security requirements regulate the security protocols adopted by members accepted into the group. If a new device's group security requirements are incompatible with the group's security requirements, the new device's attempt to join the group will fail. In addition to determining the group's security requirements, the security entity creates a MAC address and a globally unique group ID for the service group. The group ID may comprise the group's MAC address and a group name. Multicast transmission destined for the group will carry both the group MAC address and the group ID. Next, if the group's security requirements permit the use of a group shared key (decision 1106), the security entity generates a group shared key (operation 1108). Additionally, if the group's security requirements permit the use of group authentication information (decision 1110), the security entity generates group shared authentication information (operation 1112). Finally, the local device begins advertising the service group with the group's ID (operation 1114).

The flowchart in FIG. 12 illustrates the second variation. Here, the local device pairwise authenticates with a remote device so that a local service endpoint may establish a datapath with a remote service endpoint executing on the remote device (operation 1202). In response to the pairwise authentication, the local device's security entity may begin negotiations with the remote security entity to found a service group specific to the service endpoints' service. In contrast with the first variation, the security entity determines the group's security requirements from both the local service endpoint's security requirements and the remote service endpoint's security requirements (operation 1204), by, for example, selecting options that are acceptable to the security requirements of both service endpoints. If the security requirements are incompatible, the group founding attempt fails. Otherwise, the local device and the remote device determine which device is designated as the group founder by comparing group founder ranks (operation 1206). A device's group founder rank may correspond to the registrar intent specified by the service endpoint for which the service group is being founded. Here, the device with the higher group founder rank becomes the group founder. After selecting the group founder, the remaining steps for creating the service group may be identical to steps 1106-1114 found in the flowchart of FIG. 11.

Admitting a New Device

Referring to the flowchart in FIG. 13, once the authorized members of the group begin advertising the service group to other devices within the vicinity, authorized members may begin receiving join requests from new devices. When an authorized member receives a join request from a new device (operation 1302), the authorized member may attempt to admit the new device into the group by pairwise authenticating with the new device. If the pairwise authentication is successful and if the new device's group security requirements are compatible with the group's security requirements, the new device is admitted into the group as a new member (operation 1304).

Whether the new device is designated as an authorized group member depends on the group's security requirements. If the group's policy is to designate all members as authorized group members (decision 1306), then the new member begins performing the functions of an authorized group member immediately (1308). If the group's policy is to designate only a subset of the members as authorized group members (decision 1310), then if a new authorized group member is needed, the authorized group member may designate the new member as an authorized group member (operation 1312). Finally, if the group's policy is to periodically rotate authorized member status among the members (decision 1314), the new member may periodically be designated as the authorized group member, before rotating the status to another member after another period of time has passed (operation 1316).

Joining a Service Group

Referring to the flowchart in FIG. 14, a local service endpoint may, at some point, instruct the local device's security entity to join a service group that is specific to the service endpoint's service (operation 1402). The security entity or the local device's service discovery module may listen for service advertisements from service groups within the vicinity. In some cases, the device may already know of the existence of a group that matches the service endpoint's service prior to receiving a request from the service endpoint to join the group. Once the local device detects an advertisement from a group whose service matches that of the service endpoint's (operation 1404), the local device may attempt to join the group by communicating with one of the group's authorized group members. While negotiating with the authorized group member, the device may compare the service endpoint's group security requirements with the group's security requirements to determine compatibility (decision 1406). If the service endpoint's group security requirements are incompatible, the join attempt fails, with the security entity sending a status failure to the service endpoint (operation 1408). Otherwise, the security entity negotiates with the authorized group member to determine how flexible the group's security requirements are. For example, if the group's security requirements permit both the use of a group shared key or source-generated keys, then new devices are free to choose one of the two options. On the other hand, if the group requires the use of source-generated keys, then new devices will use source-generated keys only.

Returning to the flowchart in FIG. 14, if the group allows unprotected multicasting (decision 1410), the local device may skip pairwise authenticating with the authorized group member, or any other member of the group, and simply begin transmitting multicasts to the group's MAC address with the group's group ID (operation 1412). If the group allows the use of a group shared key to encrypt multicast transmissions (decision 1416), the local device initiates pairwise authentication with the authorized group member to obtain the group shared key (operation 1418). In some cases, the local device may skip the pairwise authentication process if the local device already possesses the group shared key obtained from a previous session with the group (decision 1416). Once the group shared key is obtained, the local device begins transmitting multicast transmissions that are encrypted with the group shared key to the group's MAC address (operation 1420).

If the group does not allow unprotected multicast or the use of a group shared key (decision 1414), the process continues at starting point F of FIG. 15. Here, the local device's only other option is to use source-generated keys to encrypt multicast transmissions. Thus, the local device's security entity first generates a source-generated key (operation 1502). Then, the local device pairwise authenticates with every other group member to which the local device intends to multicast (operation 1504). Once all intended multicast recipients have the local device's source-generated key (decision 1506), the local device may multicast to the group's MAC address, thereby allowing group members that possess the local device's source-generated key to decrypt the contents of the multicast.

If the local device detects that one or more other group members are using source-generated keys to encrypt multicasts (decision 1508), the local device may obtain the source-generated keys so that it may properly decrypt the multicasts. With regards to a particular group member using a source-generated key, the local device first determines whether its credential storage mechanism already possesses the source-generated key (decision 1510) and whether the service endpoint's security requirements allow the use of persisted source-generated keys (decision 1512). If so, the local device moves on to the next group member that is detected as using a source-generated key (decision 1508). If not, the local device pairwise authenticates with the group member to obtain the source-generated key (operation 1514). Once the source-generated keys for all multicasting group members have been obtained, the local device may begin securely sending and receiving multicast transmissions with other group members within the service group (operation 1516).

Service-Independent Wi-Fi Connection

While most service endpoints that run on a local device may be associated with a service that fulfills a specific function, the local device may also provide a default service endpoint that always runs and requests the security entity to preemptively establish secured Wi-Fi P2P connections with any remote devices in range. Because this "default" service endpoint's security requirements allow sharing the credentials installed on its behalf, the default service endpoint causes the device to always automatically provide shared device credentials for reuse by service endpoints that (1) are associated with actual services, (2) wish to connect with one of the remote devices, and (3) are willing to use the default service endpoint's shared credential rather than establishing its own service-specific credential.

Reusing Existing Security Resources

The disclosed embodiments provide a system that enables service-configurable wireless connections through the reuse of existing security resources. During operation, a security mechanism receives, from a local service endpoint of a first service, the local service endpoint's security requirements. The security mechanism then receives, from a remote device, a remote service endpoint's security requirements. Next, while establishing a datapath between the local and remote service endpoints, the security mechanism determines that a security resource exists on the local device, wherein the security resource was previously created or allocated for establishing a datapath between the local and remote devices on behalf of a second service. Next, if the security requirements of the local and remote service endpoints permit the use of preexisting security resources, using the security resource to establish a datapath between the local and remote service endpoints.

In some embodiments, the security resource includes authentication information that was previously exchanged between the local and remote devices on behalf of the second service using an OOB mechanism.

In some embodiments, the security resource includes using the authentication information to securely exchange a credential between the local and remote devices on behalf of the first service.

In some embodiments, the security requirements of the local and remote service endpoints forbid the reuse of pre-existing authentication information that was exchanged using at least one of the following OOB mechanisms: a push button mechanism, a PIN mechanism, a QR code mechanism, a NFC mechanism, a USB mechanism, and a BTLE mechanism.

In some embodiments, the security resource includes a credential that was previously exchanged between the local and remote devices on behalf of the second service.

In some embodiments, using the security resource includes reusing the credential to establish a Wi-Fi connection between the local and remote devices on behalf of the first service.

In some embodiments, the security resource includes an encryption key created for encrypting another datapath established between the local and remote devices on behalf of the second service.

In some embodiments, one of the local and remote service endpoints requires data encryption.

In some embodiments, reusing the security resource includes establishing an encrypted datapath between the local and remote service endpoints on behalf of the first service using the encryption key.

In some embodiments, the security resource includes an existing virtual port created for establishing another datapath between the local device and the remote device on behalf of the second service.

In some embodiments, reusing the security resource includes establishing an unencrypted datapath between the local and remote service endpoints on behalf of the first service using the virtual port.

In some embodiments, the security resource includes an existing unauthenticated Wi-Fi connection between the local device and the remote device.

In some embodiments, one of the local and remote service endpoints requires data encryption.

In some embodiments, reusing the security resource includes generating encryption keys and using the encryption keys to establish an encrypted datapath between the local and remote service endpoints over the unauthenticated Wi-Fi connection on behalf of the first service.

CONCLUSION

The foregoing descriptions of embodiments have been presented for purposes of illustration and description only. They are not intended to be exhaustive or to limit the disclosure to the forms disclosed. Accordingly, many modifications and variations will be apparent to practitioners skilled in the art.

What is claimed is:

1. A wireless device, the wireless device comprising:
a processor;
a memory coupled to the processor;
a Wi-Fi transceiver coupled to the processor;
a local service endpoint of a service, configured to send a request to establish a datapath with another service endpoint on another device;
a service discovery module, configured to discover a remote service endpoint on a remote device; and
a security mechanism, configured to:
receive the local service endpoint's security requirements;
receive, via the Wi-Fi transceiver, the remote service endpoint's security requirements; and
initialize, based at least in part on the request, a Wi-Fi connection's security configuration to accommodate the local service endpoint's security requirements and the remote service endpoint's security requirements.

2. The wireless device of claim 1, wherein the datapath is an encrypted datapath.

3. The wireless device of claim 2, wherein to initialize the Wi-Fi connection's security configuration, the security mechanism is further configured to:
exchange authentication information with the remote device using an out-of-band (OOB) mechanism; and
use the authentication information to securely exchange a credential with the remote device.

4. The wireless device of claim 3, wherein to initialize the Wi-Fi connection's security configuration, the security mechanism is further configured to:
create a controlled dataport and a data encryption module, wherein the controlled dataport is initially closed;
use the credential to generate a data encryption key;
install the data encryption key in the data encryption module; and
open the controlled dataport, thereby enabling the local service endpoint and the remote service endpoint to securely exchange data through the controlled dataport.

5. The wireless device of claim 3, wherein the authentication information comprises at least one of:
a public key; and
a shared secret.

6. The wireless device of claim 3, wherein the credential comprises at least one of:
a pre-shared key (PSK); and
a pairwise master key (PMK).

7. The wireless device of claim 1, wherein to initialize the Wi-Fi connection's security configuration, the security mechanism is further configured to:
determine, from the security requirements of both service endpoints, that authentication is required for the Wi-Fi connection;
determine that a first Wi-Fi connection exists between the wireless device and the remote device;
determine that the first Wi-Fi connection does not provide data encryption;
initialize, based at least in part on a determination that the first Wi-Fi connection does not use encryption, a second Wi-Fi connection that provides data encryption between the wireless device and the remote device.

8. The wireless device of claim 1, wherein the local service endpoint comprises an instance of a service designed to execute within an application layer of the wireless device.

9. A wireless device, the wireless device comprising:
a processor;
a memory coupled to the processor;
a Wi-Fi transceiver coupled to the processor;
a local service endpoint of a service, configured to send the local service endpoint's security requirements to a security mechanism; and
the security mechanism, configured to:
receive the service endpoint's security requirements;
receive, from a remote device, a remote service endpoint's security requirements; and
determine, from the security requirements of both service endpoints, whether to perform authentication while attempting to establish a Wi-Fi connection between the wireless device and the remote device.

10. The wireless device of claim 9, wherein the attempt fails in response to one of the local and remote service endpoints requiring authentication and another one of the local and remote service endpoints prohibiting or not supporting authentication.

11. The wireless device of claim 9, wherein the attempt results in a secured Wi-Fi connection in response to one of the local and remote service endpoints requiring authentication and another one of the local and remote service endpoints requiring authentication or specifying no preference.

12. The wireless device of claim 9, wherein the attempt results in an unsecured Wi-Fi connection in response to one of the local and remote service endpoints prohibiting or not supporting authentication and another one of the local and remote service endpoints prohibiting authentication, not supporting authentication, or specifying no preference.

13. The wireless device of claim 9, wherein the security mechanism is further configured to choose, based on the security requirements of both service endpoints, one of the wireless device and the remote device to act as a registrar when establishing the Wi-Fi connection.

14. A wireless device, the wireless device comprising:
a processor;
a memory coupled to the processor;
a Wi-Fi transceiver coupled to the processor;
a local service endpoint of a service, configured to send the local service endpoint's security requirements to a security mechanism; and
the security mechanism, configured to:
receive the local service endpoint's security requirements;
receive, from a remote device, a remote service endpoint's security requirements; and
determine, from the security requirements of both service endpoints, whether to employ data encryption over a datapath between the local and remote service endpoints, wherein an attempt to establish the datapath would be made over a Wi-Fi connection between the wireless device and the remote device.

15. The wireless device of claim 14, wherein the attempt to establish the datapath fails in response to one of the local and remote service endpoints requiring data encryption and another one of the local and remote service endpoints prohibiting or not supporting data encryption.

16. The wireless device of claim 14, wherein an encrypted datapath is established in response to one of the local and remote service endpoints requiring data encryption and another one of the local and remote service endpoints requiring data encryption or specifying no preference.

17. The wireless device of claim 14, wherein an unencrypted datapath is established in response to one of the local and remote service endpoints prohibiting or not supporting data encryption and another one of the local and remote service endpoints prohibiting data encryption, not supporting data encryption, or specifying no preference.

18. The wireless device of claim 14, wherein the attempt to establish the datapath fails in response to the Wi-Fi connection being a secured Wi-Fi connection and one of the local and remote service endpoints prohibiting or not supporting data encryption.

19. The wireless device of claim 14, wherein an encrypted datapath is established in response to the Wi-Fi connection being a secured Wi-Fi connection and each of the local and remote service endpoints requiring data encryption or specifying no preference.

20. The wireless device of claim 14, wherein an unencrypted datapath is established in response to the Wi-Fi connection being an unsecured Wi-Fi connection and each of the local and remote service endpoints prohibiting or not supporting data encryption.

21. The wireless device of claim 14, wherein in response to the Wi-Fi connection being a secured Wi-Fi connection and a determination that an encrypted datapath is to be established, an encryption key is generated from one of the following:
a credential that is delivered using unverified authentication information; and
a credential that is delivered using preconfigured authentication information.

* * * * *